US008843679B2

(12) United States Patent
Toba et al.

(10) Patent No.: US 8,843,679 B2
(45) Date of Patent: Sep. 23, 2014

(54) TRANSMITTING DEVICE, TRANSMITTING METHOD, RECEIVING DEVICE, RECEIVING METHOD, TRANSMITTING/RECEIVING SYSTEM, AND CABLE

(75) Inventors: Kazuaki Toba, Kanagawa (JP); Kazuyoshi Suzuki, Tokyo (JP); Gen Ichimura, Tokyo (JP); Toshihide Hayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/825,484

(22) PCT Filed: Sep. 22, 2011

(86) PCT No.: PCT/JP2011/071563
§ 371 (c)(1),
(2), (4) Date: Mar. 21, 2013

(87) PCT Pub. No.: WO2012/043351
PCT Pub. Date: Apr. 5, 2012

(65) Prior Publication Data
US 2013/0191563 A1 Jul. 25, 2013

(30) Foreign Application Priority Data

Sep. 30, 2010 (JP) ................................. 2010-220328

(51) Int. Cl.
G06F 3/00 (2006.01)
H04N 7/18 (2006.01)
H04N 5/775 (2006.01)
H04N 21/41 (2011.01)
H04N 21/4363 (2011.01)
H04L 25/02 (2006.01)

(52) U.S. Cl.
CPC ................ *G60F 13/38* (2013.01); *H04N 5/775* (2013.01); *H04N 21/4122* (2013.01); *H04N 21/43635* (2013.01); *H04L 25/0272* (2013.01)

USPC ................ 710/62; 710/38; 710/316; 725/85; 725/80

(58) Field of Classification Search
CPC .................................................. H04N 21/43635
USPC ................................. 725/85, 80; 710/38, 316
See application file for complete search history.

(56) References Cited

U.S. PATENT DOCUMENTS

| 8,169,499 | B2 | 5/2012 | Shimoda | |
| 8,291,207 | B2* | 10/2012 | Kobayashi | 713/1 |
| 2009/0248924 | A1* | 10/2009 | Melin | 710/63 |

FOREIGN PATENT DOCUMENTS

JP 2008-011396 A 1/2008

OTHER PUBLICATIONS

High-Definition Multimedia Interface Specification Version 1.4, Feb. 2, 2010.

*Primary Examiner* — Ernest Unelus
(74) *Attorney, Agent, or Firm* — Lerner, David, Littenberg, Krumholz & Mentlik, LLP

(57) ABSTRACT

To enable signal transmission at a high data rate while securing backward compatibility.
A source device 110 and a sink device 120 are connected by an HDMI cable 200. The source device 110 is compatible with both current HDMI and new HDMI. The number of differential signal channels for transmitting digital signals such as video data is three in the current HDMI, but is six in the new HDMI, for example. In a case where the cable 200 is compatible with the new HDMI, and the sink device 120 is compatible with the new HDMI, a control unit 113 of the source device 110 controls a data transmitting unit 112 to operate in a new HDMI operating mode. In a case where the control unit 113 determines that at least the sink device 120 is compatible only with the current HDMI, or at least the cable 200 is compatible with the current HDMI, the control unit 113 controls the data transmitting unit 112 to operate in a current HDMI operating mode.

25 Claims, 19 Drawing Sheets

FIG. 6

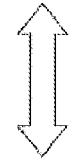

(a) CURRENT HDMI PIN ASSIGNMENT (Type-A)

| PIN | Signal Assignment |
|---|---|
| 1 | TMDS Data#2+ |
| 2 | TMDS Data#2 Shield |
| 3 | TMDS Data#2- |
| 4 | TMDS Data#1+ |
| 5 | TMDS Data#1 Shield |
| 6 | TMDS Data#1- |
| 7 | TMDS Data#0+ |
| 8 | TMDS Data#0 Shield |
| 9 | TMDS Data#0- |
| 10 | TMDS Clock+ |
| 11 | TMDS Clock Shield |
| 12 | TMDS Clock- |
| 13 | CEC |
| 14 | Utility/HEAC+ |
| 15 | SCL |
| 16 | SDA |
| 17 | DDC/CEC Ground /HEAC Shield |
| 18 | +5V Power |
| 19 | Hot Plug Detect/HEAC- |

(b) NEW HDMI PIN ASSIGNMENT

| PIN | Signal Assignment |
|---|---|
| 1 | TMDS Data#0+ |
| 2 | TMDS Data#4+ |
| 3 | TMDS Data#0- |
| 4 | TMDS Data#1+ |
| 5 | TMDS Data#4- |
| 6 | TMDS Data#1- |
| 7 | TMDS Data#2+ |
| 8 | TMDS Data#5+ |
| 9 | TMDS Data#2- |
| 10 | TMDS Data#3+ |
| 11 | TMDS Data#5- |
| 12 | TMDS Data#3- |
| 13 | CEC |
| 14 | Utility/HEAC+ |
| 15 | SCL |
| 16 | SDA |
| 17 | DDC/CEC Ground /HEAC Shield |
| 18 | +5V Power |
| 19 | Hot Plug Detect/HEAC- |

FIG. 7
(a) CURRENT HDMI PIN LAYOUT
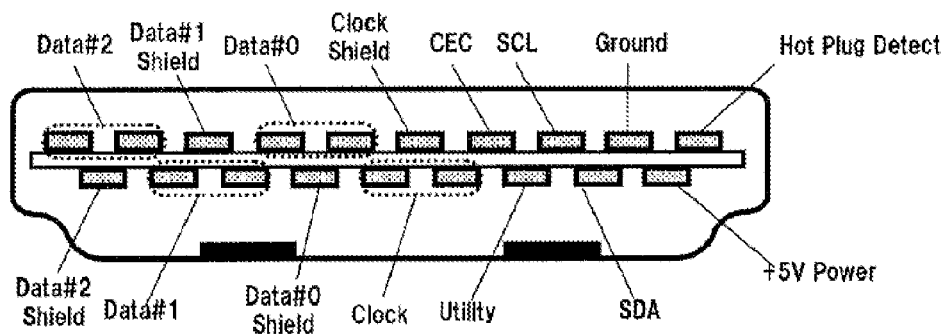
(b) NEW HDMI PIN LAYOUT
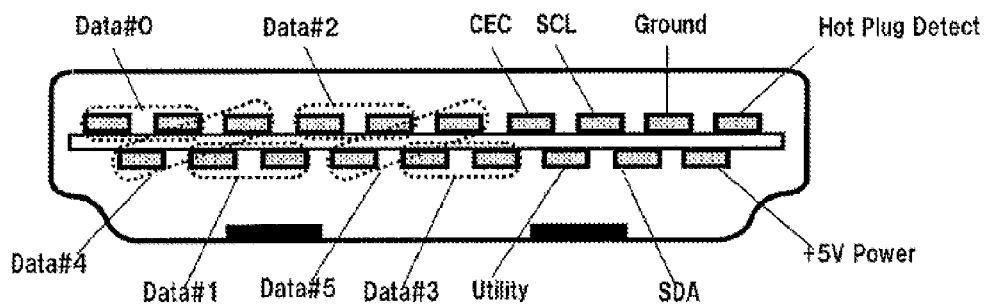

EXEMPLARY STRUCTURE OF
NEW HDMI CABLE

EXEMPLARY STRUCTURE OF
NEW HDMI CABLE

FIG. 14

EXEMPLARY EDID

| Byte # | 7 | 6 | 5 | 4 | 3 | 2 | 1 | 0 |
|---|---|---|---|---|---|---|---|---|
| | Rsvd (0) | Rsvd (0) | Rsvd (0) | Rsvd (0) | Rsvd (0) | New Rx Sink | New Cable | Rsvd (0) |

EXEMPLARY NEW HDMI CABLE

EXAMPLE OF EDID DATA REWRITE
CIRCUIT IN LSI IN CABLE

EXAMPLE OF CABLE INFORMATION
NOTIFICATION CIRCUIT USING RF TAG CHIP

FIG. 19
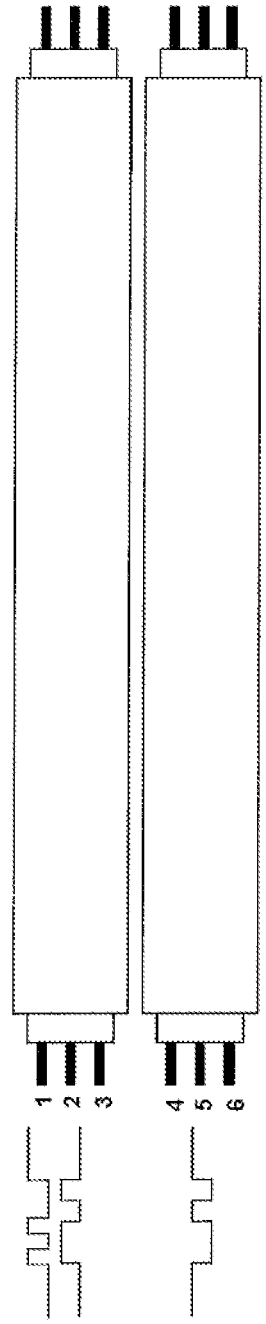
(a) CURRENT HDMI CABLE
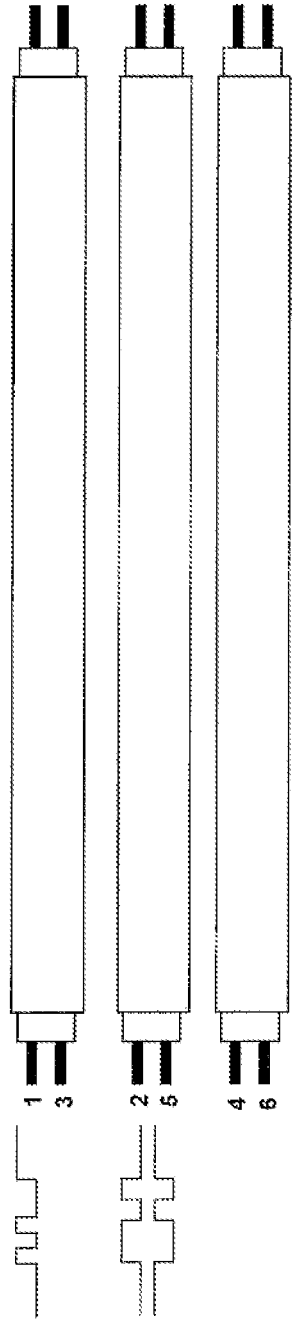
(b) NEW HDMI CABLE

FIG. 20
(a) CURRENT HDMI PLUG
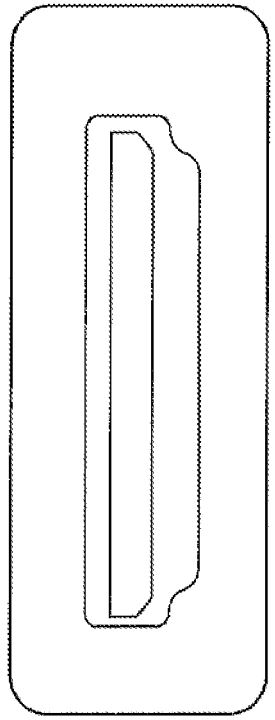
(b) CURRENT HDMI RECEPTACLE
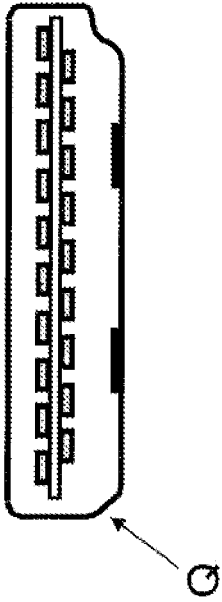
(c) NEW HDMI PLUG
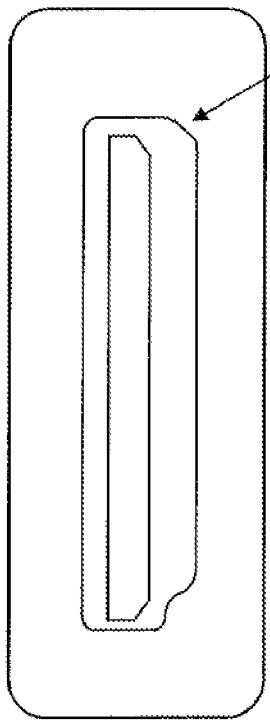
(d) NEW HDMI RECEPTACLE FIG. 21
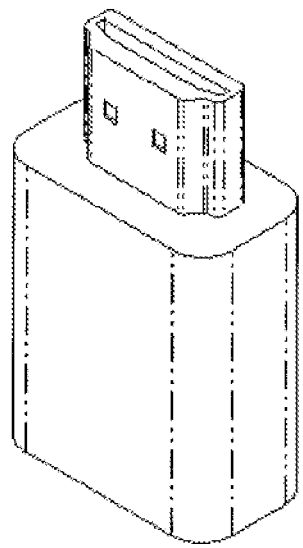
(a) CONVENTIONAL HDMI PLUG
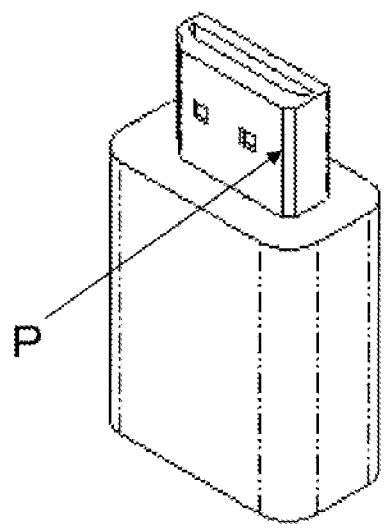
(b) NEW HDMI PLUG

TRANSMITTING DEVICE, TRANSMITTING METHOD, RECEIVING DEVICE, RECEIVING METHOD, TRANSMITTING/RECEIVING SYSTEM, AND CABLE

CROSS-REFERENCE TO RELATED APPLICATION

The present application is a national phase entry under 35 U.S.C. §371 of International Application No. PCT/JP2011/071563 filed Sep. 22, 2011, published on Apr. 5, 2012 as WO 2012/043351 A1, which claims priority from Japanese Patent Application No. JP 2010-220328 filed in the Japanese Patent Office on Sep. 30, 2010.

TECHNICAL FIELD

This invention relates to a transmitting device, a transmitting method, a receiving device, a receiving method, a transmitting/receiving system, and a cable, and more particularly, to a transmitting device or the like that transmits digital signals such as video signals via a transmission path with differential signals.

BACKGROUND ART

In recent years, HDMI (High Definition Multimedia Interface) has been widely used as digital interfaces that connect CE (Consumer Electronics) devices, and has become a defacto standard. For example, Non-Patent Document 1 describes the HDMI standard. According to the HDMI standard, three data differential line pairs (TMDS Channels 0/1/2) are used, and video, audio, and control signals are transmitted as digital signals.

CITATION LIST

Non-Patent Document

Non-Patent Document 1: High-Definition Multimedia Interface Specification Version 1.4, Feb. 2, 2010

SUMMARY OF THE INVENTION

Problems to be Solved by the Invention

At present, the value defined as the digital signal transmission speed by the HDMI standard is approximately 10.2 Gbps at the highest. To cope with high-quality 3D (3-dimension) video signals and video signals of the future 4k2k (QFHD) and high-resolution content, the transmission speed in the future is expected to be increased to 15 Gbps or 20 Gbps, which is higher than the highest value defined by the current HDMI standard.

There are two possible approaches to the higher-speed HDMI. One is a technique by which the current three data differential line pairs are used as they are, and the clock speed at which data is transmitted is increased so as to increase the transmission rate accordingly. By this technique, however, extending the transmission band only by increasing the clock speed is difficult due to the physical limit on the use of copper cable differential pairs. Even if this technique can be used, it is easy to assume that the transmission distance will become extremely short. That is, limitations will be put on the lengths of HDMI cables connecting devices.

The other means to solve the problem relevant to the present invention is to increase the number of data differential line pairs, which is currently three, to four or larger. The data rate can be increased by the amount equivalent to the increase in the number of data transmitting lanes. By this technique of increasing the data differential line pairs, however, the compatibility with the current HDMI becomes an issue. Specifically, if the number of pins in each connector, which is conventionally 19, is simply increased by the number of data differential line pairs, the compatibility with conventional devices will be lost, and misunderstandings and confusion will be caused among users. Therefore, this technique is not preferable.

A solution to this is maintaining the compatibility of each connector (plug or receptacle). That is, the wiring needs to be designed so that any functional defects will not be caused in the cables while the conventional 19-pin connectors are used as they are.

An object of this invention is to provide a novel digital interface (new HDMI) that has a high degree of compatibility with the current HDMI, and can transmit signals at a higher data rate than the current HDMI. Another object of this invention is to provide a transmitting device and a receiving device that have the functions of the current HDMI and the new HDMI, and perform excellent signal transmission.

Solutions to Problems

A concept of this invention lies in a transmitting device that includes: a digital signal transmitting unit that transmits a digital signal to an external device via a transmission path with a differential signal, and has a first operating mode involving a first number of channels for the differential signal and a second operating mode involving a second number of channels for the differential signal, the second number being larger than the first number; an operating mode determining unit that determines whether the external device and the transmission path are compatible with the second operating mode; and an operation control unit that controls the operation of the digital signal transmitting unit, based on the determination performed by the operating mode determining unit.

In this invention, the digital signal transmitting unit transmits a digital signal to the external device (a receiving device) via the transmission path with a differential signal. The digital signal transmitting unit has the first operating mode and the second operating mode, and selectively uses one of the modes. The number of differential signal channels is the first number in the first operating mode, and is the second number, which is larger than the first number, in the second operating mode. For example, the first operating mode is a current HDMI operating mode, and the first number is three. The second operating mode is a new HDMI operating mode, and the second number is six, which is larger than three.

For example, the transmission path is a cable, and a receptacle having pins is provided for connecting a plug of this cable thereto. The digital signal transmitting unit selects a first pin assignment in the first operating mode, and selects a second pin assignment in the second operating mode. The second pin assignment is different from the first pin assignment. In the second pin assignment, a terminal that is used as a shield terminal corresponding to a signal terminal of a differential signal for a digital signal and/or a clock signal in the first pin assignment is used as a signal terminal of a differential signal for a digital signal, for example. Alternatively, in the second pin assignment, a signal terminal of a differential signal for a clock signal in the first pin assignment is used as a signal terminal of a differential signal for a digital signal, for example.

The operating mode determining unit determines whether the external device and the transmission path are compatible with the second operating mode. For example, the operating mode determining unit determines whether the external device is compatible with the second operating mode, based on the capability information about the external device. The capability information is read from the external device via the transmission path. Alternatively, the operating mode determining unit determines whether the external device is compatible with the second operating mode, by performing communication with the external device via the transmission path, for example.

For example, the operating mode determining unit determines whether the transmission path is compatible with the second operating mode, by using the information providing function of the transmission path compatible with the second operating mode. The information providing function of the transmission path compatible with the second operating mode is a function to report to the external device that the transmission path is compatible with the second operating mode, for example. The external device has a function to add the information reported from the transmission path to the capability information thereof. The operating mode determining unit determines whether the transmission path is compatible with the second operating mode, based on the capability information read from the external device via the transmission path.

Alternatively, the information providing function of the transmission path compatible with the second operating mode is a function to rewrite the information indicating whether the transmission path is compatible with the second operating mode so as to indicate that compatibility with the second operating mode, for example. The information is contained in the capability information read from the external device. The operating mode determining unit determines whether the transmission path is compatible with the second operating mode, based on the capability information read from the external device via the transmission path.

Alternatively, the information providing function of the transmission path compatible with the second operating mode is a function to provide information indicating that the transmission path is compatible with the second operating mode through near field communication, for example. The operating mode determining unit determines whether the transmission path is compatible with the second operating mode, based on whether the information indicating that the transmission path is compatible with the second operating mode is provided from the transmission path through the near field communication.

The operating mode determining unit transmits a differential signal for a predetermined digital signal to the external device, by using a pair of signal lines in the transmission path, for example. The pair of signal lines does not form a differential signal transmission path in the first operating mode, but do form a differential signal transmission path in the second operating mode. Based on a signal sent from the external device, the operating mode determining unit performs the determination. The signal sent from the external device is a signal that indicates whether a received digital signal obtained through the predetermined differential signal received by the external device is correct, for example. Alternatively, the signal sent from the external device is a received digital signal obtained through the predetermined differential signal received by the external device, for example.

As described above, in this invention, the digital signal transmitting unit has the first operating mode in which the number of differential signal channels is the first number, and the second operating mode in which the number of differential signal channels is the second number, which is larger than the first number. As the second operating mode (a new HDMI standard) is used, signal transmission can be performed at a high data rate. Also, when the external device, the transmission path, or the like is not compatible with the second operating mode, the first operating mode (the current HDMI standard) is used, to secure backward compatibility.

In this invention, the transmission device further includes an information transmitting unit that transmits the result of the determination performed by the operating mode determining unit to the external device via the transmission path, for example. In this case, when the external device includes a digital signal receiving unit that has the first operating mode in which the number of differential signal channels is the first number and the second operating mode in which the number of differential signal channels is the second number, which is larger than the first number, operations of the digital signal receiving unit can be controlled based on the above mentioned determination result, for example.

In this invention, the shape of the receptacle may match the shape of a plug of a cable compatible with the second operating mode, and may include the shape of a plug of a cable compatible with the first operating mode. In this case, the plug of the cable compatible with the second operating mode can be connected to the receptacle, and the plug of the cable compatible with the first operating mode can also be connected to the receptacle. In this manner, backward compatibility is secured in terms of cable connections. In this case, the shape of the receptacle of a transmitting device including a digital signal transmitting unit compatible only with the first operating mode matches the shape of the plug of the cable compatible with the first operating mode. Therefore, the plug of the cable compatible with the second operating mode cannot be connected to this receptacle.

In this invention, the transmitting device may further include a display control unit that controls display on a display unit for providing control information about the operation control unit to a user. In this case, the user can easily recognize how the digital signal transmitting unit is being controlled. For example, the user can easily recognize whether the digital signal transmitting unit is in the first operating mode or in the second operating mode.

In this invention, when the operating mode determining unit has determined that the external device and the transmission path are compatible with the second operating mode, the display control unit may perform control to display a user interface screen on the display unit. The user interface screen is for allowing a user to select the first operating mode or the second operating mode for the digital signal transmitting unit. In this case, the user can arbitrarily set an operating mode for the digital signal transmitting unit, based on the user interface screen.

Another concept of this invention lies in a receiving device that includes: a digital signal receiving unit that receives a digital signal from an external device via a transmission path with a differential signal, and has a first operating mode involving a first number of channels for the differential signal and a second operating mode involving a second number of channels for the differential signal, the second number being larger than the first number; an information receiving unit that receives, from the external device, operating mode information indicating which one of the first operating mode and the second operating mode is to be selected; and an operation control unit that controls the operation of the digital signal receiving unit, based on the operating mode information received by the information receiving unit.

In this invention, the digital signal receiving unit receives a digital signal from the external device (the transmitting device) via the transmission path with a differential signal. The digital signal receiving unit has the first operating mode and the second operating mode, and selectively uses one of the modes. The number of differential signal channels is the first number in the first operating mode, and is the second number, which is larger than the first number, in the second operating mode. For example, the first operating mode is a current HDMI operating mode, and the first number is three. The second operating mode is a new HDMI operating mode, and the second number is six, which is larger than three.

The information receiving unit receives, from the external device, the operating mode information indicating which one of the first operating mode and the second operating mode is to be selected. Based on the operating mode information received by the information receiving unit, the operation control unit controls the operation of the digital signal receiving unit. In this case, the operating mode of the digital signal receiving unit can be easily made the same as the operating mode of the digital signal transmitting unit of the external device, and digital signals can be received from the external device in an excellent manner.

Another concept of this invention lies in a transmitting/receiving system formed by connecting a transmitting device and a receiving device via a transmission path. The transmitting device includes: a digital signal transmitting unit that transmits a digital signal to the receiving device via the transmission path with a differential signal, and has a first operating mode involving a first number of channels for the differential signal and a second operating mode involving a second number of channels for the differential signal, the second number being larger than the first number; an operating mode determining unit that determines whether the receiving device and the transmission path are compatible with the second operating mode; a transmitting operation control unit that controls the operation of the digital signal transmitting unit, based on the determination performed by the operating mode determining unit; and an information transmitting unit that transmits operating mode information about the digital signal transmitting unit to the receiving device via the transmission path. The receiving device includes: a digital signal receiving unit that receives the digital signal from the transmitting device via the transmission path with the differential signal, and has the first operating mode involving the first number of channels for the differential signal and the second operating mode involving the second number of channels for the differential signal; an information receiving unit that receives the operating mode information from the transmitting device via the transmission path; and a receiving operation control unit that controls the operation of the digital signal receiving unit, based on the operating mode information received by the information receiving unit.

Yet another concept of this invention lies in a cable that transmits a digital signal from a transmitting device to a receiving device with a differential signal having a predetermined number of channels, and includes an information providing function unit that provides information indicating the signal transmission capability of the cable to the transmitting device or the receiving device.

For example, the information providing function unit provides the information indicating the signal transmission capability of the cable to the receiving device or the transmitting device via the cable, in response to a request from the receiving device or the transmitting device. Also, the information providing function unit rewrites part of capability information the transmitting device reads from the receiving device via the cable, for example. Also, the information providing function unit provides the information indicating the signal transmission capability of the cable to the transmitting device or the receiving device through near field communication, for example.

Effects of the Invention

According to this invention, signal transmission can be performed at a high data rate while backward compatibility is secured.

BRIEF DESCRIPTION OF DRAWINGS

FIG. 6 is a diagram showing a comparison between a pin assignment of current HDMI (Type A) and a pin assignment of new HDMI.

FIG. 7 is a diagram showing the pin layouts in the receptacles of source devices and sink devices of the current HDMI and the new HDMI.

FIG. 14 is a diagram showing an example of flag information newly defined in EDID.

FIG. 19 is a diagram for explaining that the electrical properties of the cable are measured to determine whether the cable is compatible with the new HDMI.

FIG. 20 is a diagram for explaining other examples of the shapes of a plug of a new HDMI cable and a receptacle.

FIG. 21 is a perspective view of a plug of a current HDMI cable and a plug of a new HDMI cable.

MODES FOR CARRYING OUT THE INVENTION

The following is a description of modes for carrying out the invention (hereinafter referred to as "embodiments"). Explanation will be made in the following order.

1. Embodiments
2. Modifications

<1. Embodiments>

[Exemplary Structure of an AV System]

Figure 1:
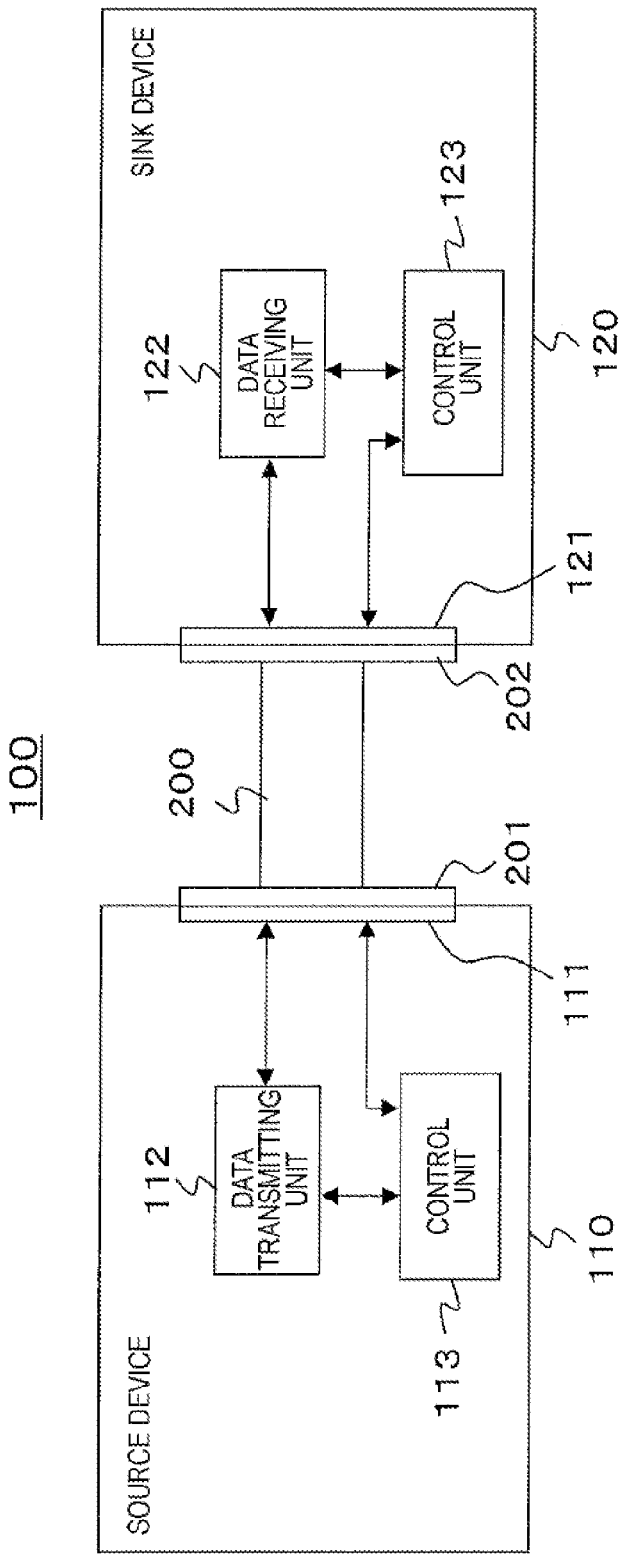
FIG. 1 is a block diagram showing an exemplary structure of an AV system as an embodiment of this invention.

FIG. 1 shows an exemplary structure of an AV (Audio and Visual) system 100 as an embodiment. This AV system 100 is formed by connecting a source device 110 and a sink device 120. The source device 110 is an AV source such as a game machine, a disk player, a set-top box, a digital camera, or a portable telephone. The sink device 120 is a television receiver or a projector, for example.

The source device 110 and the sink device 120 are connected via a cable 200. In the source device 110, a receptacle 111 that has a data transmitting unit 112 connected thereto and forms a connector is provided. In the sink device 120, a receptacle 121 that has a data receiving unit 122 connected thereto and forms a connector is provided. A plug 201 that forms a connector is provided at one end of the cable 200, and a plug 202 that forms a connector is provided at the other end. The plug 201 at the one end of the cable 200 is connected to the receptacle 111 of the source device 110, and the plug 202 at the other end of the cable 200 is connected to the receptacle 121 of the sink device 120.

The source device 110 includes a control unit 113. The control unit 113 controls the entire source device 110. In this embodiment, the data transmitting unit 112 of the source device 110 is compatible with both current HDMI and new HDMI. In a case where the control unit 113 determines that the cable 200 is compatible with the new HDMI, and the sink device 120 is compatible with the new HDMI, the control unit 113 controls the data transmitting unit 112 to operate in a new HDMI operating mode. In a case where the control unit 113 determines that at least the sink device 120 is compatible only with the current HDMI, or at least the cable 200 is compatible with the current HDMI, the control unit 113 controls the data transmitting unit 112 to operate in a current HDMI operating mode.

The sink device 120 includes a control unit 123. The control unit 123 controls the entire sink device 120. In this embodiment, the data receiving unit 122 of the sink device 120 is compatible only with the current HDMI or is compatible with both the current HDMI and the new HDMI. In a case where the data receiving unit 122 is compatible with both the current HDMI and the new HDMI, the control unit 123 controls the data receiving unit 122 to operate in the same operating mode as the data transmitting unit 112 of the source device 110. In this case, based on an operating mode determination result that is sent from the source device 110 through a line such as a CEC line, the control unit 123 controls the operating mode of the data receiving unit 122. The cable 200 is compatible with the current HDMI or the new HDMI.

Figure 2:
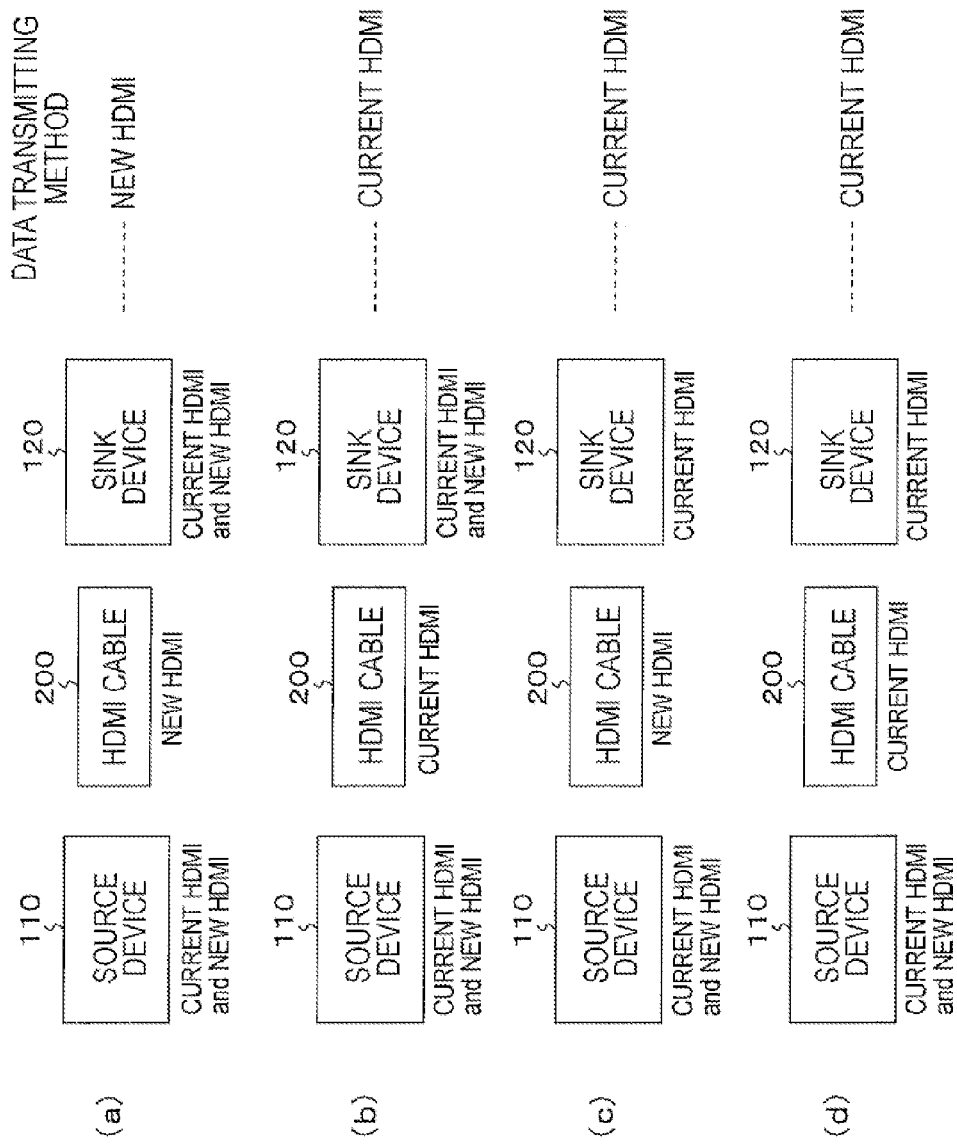
FIG. 2 is a diagram showing example combinations of a source device, an HDMI cable, and a sink device.

In the AV system 100 shown in FIG. 1, when the cable 200 is compatible with the new HDMI while the sink device 120 is compatible with both the current HDMI and the new HDMI as shown in FIG. 2(a), data transmission is performed through the new HDMI. At this point, the data transmitting unit 112 of the source device 110 and the data receiving unit 122 of the sink device 120 are controlled to operate in the new HDMI operating mode.

In the AV system 100 shown in FIG. 1, when at least the cable 200 is compatible with the current HDMI or when the sink device 120 is compatible only with the current HDMI as shown in FIGS. 2(b) through 2(d), data transmission is performed through the current HDMI. At this point, the data transmitting unit 112 of the source device 110 is controlled to operate in the current HDMI operating mode. The data receiving unit 122 of the sink device 120 compatible with both the current HDMI and the new HDMI is controlled to operate in the current HDMI operating mode. In the case illustrated in FIG. 2(b), when the cable 200 can transmit data through the new HDMI as the data transfer rate is lowered, data transmission might be performed in the new HDMI operating mode.

[Exemplary Structures of the Data Transmitting Unit and the Data Receiving Unit]

Figure 3:
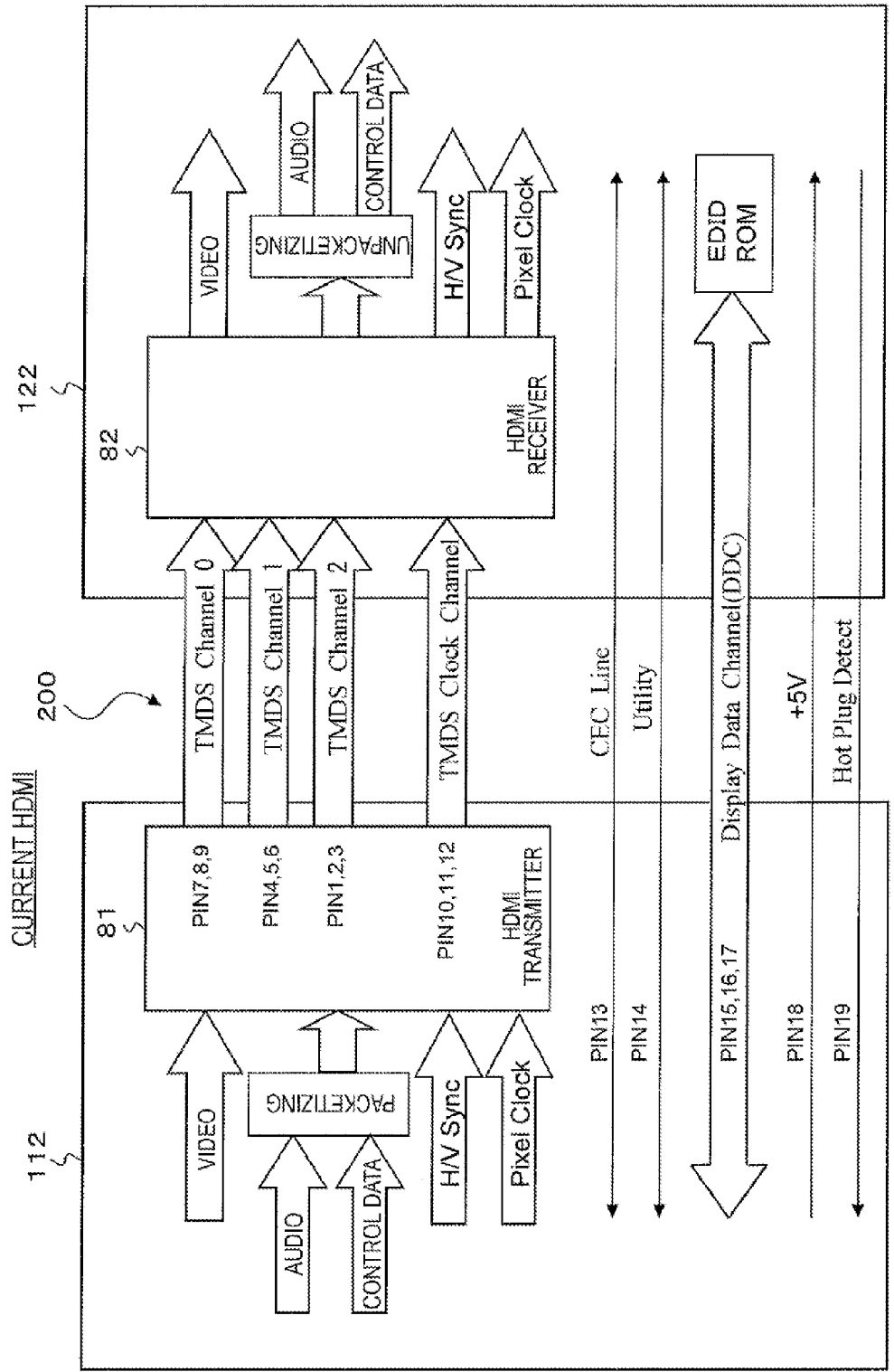
FIG. 3 is a diagram showing exemplary structures of the data transmitting unit of a source device and the data receiving unit of a sink device (in a current HDMI operating mode).
Figure 4:
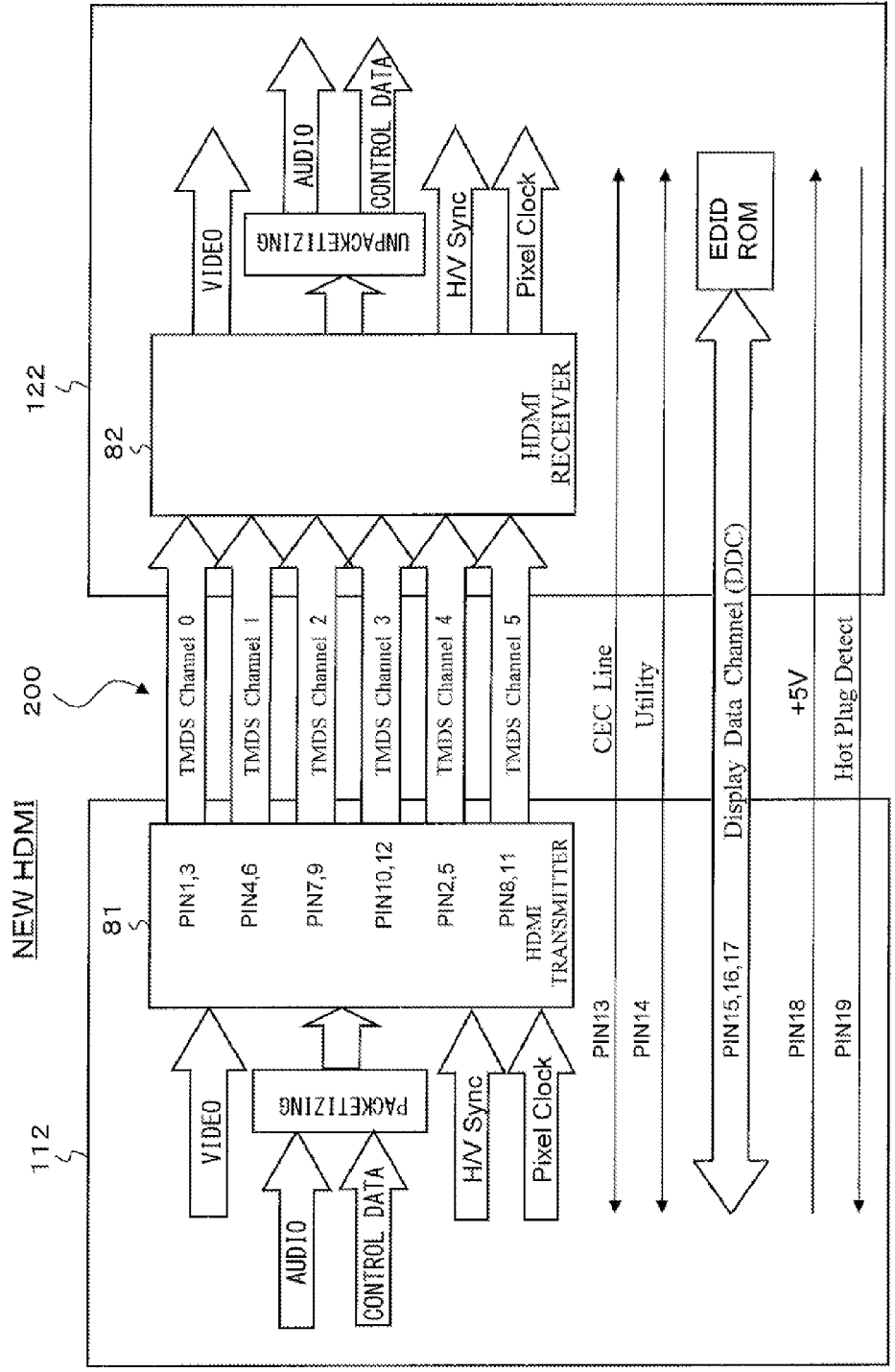
FIG. 4 is a diagram showing exemplary structures of the data transmitting unit of a source device and the data receiving unit of a sink device (in a new HDMI operating mode).

FIGS. 3 and 4 show exemplary structures of the data transmitting unit 112 of the source device 110 and the data receiving unit 122 of the sink device 120 in the AV system 100 shown in FIG. 1. In an effective image period (also called an "active video period"), the data transmitting unit 112 unidirectionally transmits differential signals corresponding to uncompressed video data of one screen, to the data receiving unit 122 through more than one channel.

Here, an effective image period is a period from a vertical synchronization signal to the next vertical synchronization signal minus the horizontal blanking period and the vertical blanking period. In the horizontal blanking period or the vertical blanking period, the data transmitting unit 112 also unidirectionally transmits at least differential signals corresponding to the audio data, control data, and other auxiliary data accompanying the video data, to the data receiving unit 122 through more than one channel.

In the active video period, the data receiving unit 112 receives the differential signals corresponding to the video data unidirectionally transmitted from the data transmitting unit 122 through more than one channel. In the horizontal blanking period or the vertical blanking period, the data receiving unit 122 also receives the differential signals corresponding to the audio data and control data unidirectionally transmitted from the data transmitting unit 112 through more than one channel.

The transmission channels of the HDMI system formed with the data transmitting unit 112 and the data receiving unit 122 include the following channels. First, there are differential signal channels (TMDS channels and a TMDS clock channel) as the transmission channels. The number of differential signal channels for transmitting digital signals such as video data is three in the current HDMI, but is six in the new HDMI.

The differential signal channels in the current HDMI are now described. As shown in FIG. 3, there are three TMDS channels #0 through #2 as the transmission channels for serially transmitting video data and audio data unidirectionally from the data transmitting unit 112 to the data receiving unit 122 in synchronization with a pixel clock. There is a TMDS clock channel as the transmission channel for transmitting a TMDS clock.

An HDMI transmitter 81 of the data transmitting unit 112 converts uncompressed video data to corresponding differential signals, for example, and serially transmits, through the three TMDS channels #0, #1, and #2, the differential signals unidirectionally to the data receiving unit 122 that is connected via the cable 200. The HDMI transmitter 81 also converts the audio data, necessary control data, and other auxiliary data accompanying the uncompressed video data to corresponding differential signals, and serially transmits, through the three TMDS channels #0, #1, and #2, the differential signals unidirectionally to the data receiving unit 122.

Further, the HDMI transmitter 81 transmits a TMDS clock synchronized with the video data, which are transmitted through the three TMDS channels #0, #1, and #2, to the data receiving unit 122 through the TMDS clock channel. Here, in one TMDS channel #i (i=0, 1, 2), 10-bit video data is transmitted in one clock of the TMDS clock.

An HDMI receiver 82 of the data receiving unit 122 receives the differential signals corresponding to the video data and the differential signals corresponding to the audio data and control data, which are transmitted unidirectionally from the data transmitting unit 112, through the TMDS channels #0, #1, and #2. In this case, the reception is performed in synchronization with the pixel clock (the TMDS clock) transmitted from the data transmitting unit 112 through the TMDS clock channel.

Next, the differential signal channels in the new HDMI are described. As shown in FIG. 4, there are six TMDS channels #0 through #5 as the transmission channels for serially transmitting video data and audio data unidirectionally from the data transmitting unit 112 to the data receiving unit 122 in synchronization with a pixel clock. In this new HDMI, a self-clock technique by which the transmission of the TMDS clock is skipped, and the clock is reproduced from received data at the receiving end is used.

The HDMI transmitter 81 of the data transmitting unit 112 converts uncompressed video data to corresponding differential signals, for example, and serially transmits, through the six TMDS channels #0 through #5, the differential signals unidirectionally to the data receiving unit 122 that is connected via the cable 200. The HDMI transmitter 81 also converts the audio data, necessary control data, and other auxiliary data accompanying the uncompressed video data to corresponding differential signals, and serially transmits, through the six TMDS channels #0 through #5, the differential signals unidirectionally to the data receiving unit 122.

The HDMI receiver 82 of the data receiving unit 122 receives the differential signals corresponding to the video data and the differential signals corresponding to the audio data and control data, which are transmitted unidirectionally from the data transmitting unit 112, through the TMDS channels #0 through #5. In this case, the HDMI receiver 82 reproduces the pixel clock from the received data, and performs reception in synchronization with the pixel clock (the TMDS clock).

The transmission channels of the HDMI system include not only the above described TMDS channels and the TMDS clock channel, but also transmission channels called a DDC (Display Data Channel) and a CEC line. The DDC is formed with two signal lines (not shown) included in the cable 200. The DDC is used by the data transmitting unit 112 to read E-EDID (Enhanced Extended Display Identification Data) from the data receiving unit 122.

That is, the data receiving unit 122 includes not only the HDMI receiver 82 but also an EDID ROM (EEPROM) that stores the E-EDID as the capability information indicating the configuration/capability thereof. In response to a request from the control unit 113, for example, the data transmitting unit 112 reads, via the DDC, the E-EDID from the data receiving unit 122 that is connected via the cable 200.

The data transmitting unit 112 sends the read E-EDID to the control unit 113. The control unit 113 stores the E-EDID into a flash ROM or DRAM (not shown). Based on the E-EDID, the control unit 113 can recognize the setting of the capability of the data receiving unit 122. For example, the control unit 113 recognizes whether the sink device 120 including the data receiving unit 122 is compatible with the new HDMI as well as the current HDMI. The CEC line is formed with one signal line (not shown) included in the cable 200, and is used for performing bidirectional communications of control data between the data transmitting unit 112 and the data receiving unit 122.

The cable 200 also includes a line (HPD line) connected to a pin called HPD (Hot Plug Detect). The source device can use the HPD line to detect a connection with the sink device. It should be noted that this HPD line is also used as a HEAC− line forming a bidirectional communication path. The cable 200 also includes a power line (+5 V Power Line) that is used for supplying power from the source device to the sink device. The cable 200 further includes a utility line. This utility line is also used as a HEAC+ line forming a bidirectional communication path.

Figure 5:
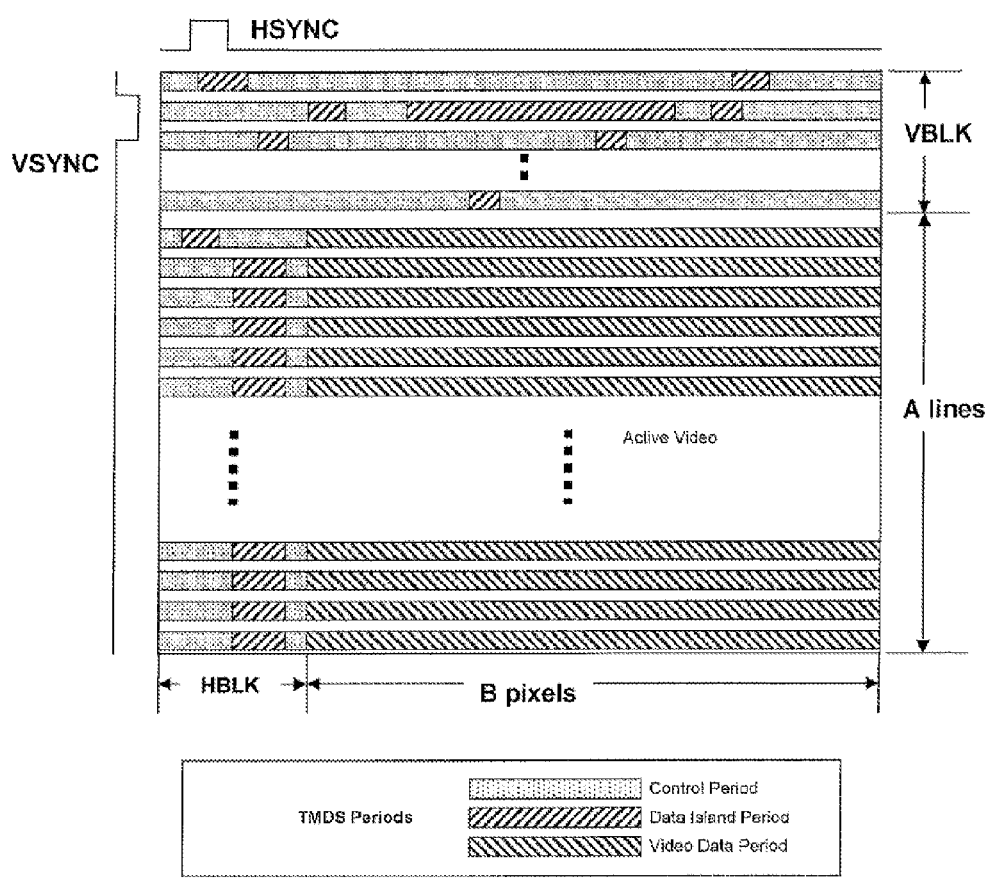
FIG. 5 is a diagram showing an exemplary structure of TMDS transmission data.

FIG. 5 shows an example data structure of TMDS transmission data. FIG. 5 shows the periods of respective types of transmission data to be transmitted in a case where image data of B pixels in the horizontal direction and A lines in the vertical direction through the TMDS channels #0 through #2 or the TMDS channels #0 through #5. Depending on the types of transmission data, there are three periods in the video field in which transmission data is transmitted through TMDS channels of an HDMI. The three types of periods are a video data period, a data island period, and a control period.

Here, a video field period is a period from the active edge of a vertical synchronization signal to the active edge of the next vertical synchronization signal. This video field period is divided into a horizontal blanking interval, a vertical blanking interval, and an active video period (Active Video). This active video period is formed by subtracting the horizontal blanking interval and the vertical blanking interval from the video field period. The video data period is assigned to the active video period. In the video data period, data of effective pixels (active pixels) of B pixels and A lines forming uncompressed image data of one screen.

The data island period and the control period are assigned to the horizontal blanking interval and the vertical blanking interval. In the data island period and the control period, auxiliary data is transmitted. That is, the data island period is assigned to part of the horizontal blanking interval and the vertical blanking interval. In this data island period, data not concerning control in the auxiliary data, such as a packet of audio data, is transmitted. The control period is assigned to the other portions of the horizontal blanking interval and the vertical blanking interval. In this control period, data concerning control in the auxiliary data, such as a vertical synchronization signal, a vertical synchronization signal, and a control packet, is transmitted.

The pin assignment in the receptacle 111 is now described. First, the pin assignment in the current HDMI (Type A) is described. The pin assignment in the current HDMI is a first pin assignment. FIG. 6(a) shows the pin assignment in the current HDMI. TMDS Data#i+ and TMDS Data#i−, which are differential signals of the TMDS channels #i (i=0 through 2), are transmitted through two lines that are differential lines. Some pins (the pins with pin numbers 7, 4, and 1) are assigned to TMDS Data#i+, and some (the pins with pin numbers 9, 6, and 3) are assigned to TMDS Data#i−. The pins with pin numbers 8, 5, and 2 are assigned to TMDS Data#i Shield (i=0 through 2).

TMDS Clock+ and TMDS Clock−, which are differential signals of the TMDS clock channel, are transmitted through two lines that are differential lines. The pin with pin number 10 is assigned to TMDS Clock+, and the pin with pin number 12 is assigned to TMDS Clock−. The pin with pin number 11 is assigned to TMDS Clock Shield.

A CEC signal that is control data is transmitted through the CEC line. The pin with pin number 13 is assigned to the CEC signal. A SDA (Serial Data) signal such as E-EDID is transmitted through a SDA line. The pin with pin number 16 is assigned to the SDA signal. A SCL (Serial Clock) signal that is the clock signal to be used for synchronization at the time of transmission/reception of the SDA signal is transmitted through a SCL line. The pin with pin number 15 is assigned to the SCL signal. The above described DDC line is formed with the SDA line and the SCL line.

The pin with pin number 19 is assigned to HPD/HEAC−. The pin with pin number 14 is assigned to Utility/HEAC+. The pin with pin number 17 is assigned to DDC/CEC Ground/HEAC Shield. The pin with pin number 18 is assigned to the power supply (+5 V Power).

Next, the pin assignment in the new HDMI is described. The pin assignment in the new HDMI is a second pin assignment. FIG. 6(*b*) shows the pin assignment in the new HDMI. TMDS Data#i+ and TMDS Data#i−, which are differential signals of the TMDS channels #i (i=0 through 5), are transmitted through two lines that are differential lines. Some pins (the pins with pin numbers 1, 4, 7, 10, 2, and 8) are assigned to TMDS Data#i+, and some (the pins with pin numbers 3, 6, 9, 12, 5, and 11) are assigned to TMDS Data#i−.

A CEC signal that is control data is transmitted through the CEC line. The pin with pin number 13 is assigned to the CEC signal. A SDA (Serial Data) signal such as E-EDID is transmitted through a SDA line. The pin with pin number 16 is assigned to the SDA signal. A SCL (Serial Clock) signal that is the clock signal to be used for synchronization at the time of transmission/reception of the SDA signal is transmitted through a SCL line. The pin with pin number 15 is assigned to the SCL signal. The above described DDC line is formed with the SDA line and the SCL line.

The pin with pin number 19 is assigned to HPD/HEAC−. The pin with pin number 14 is assigned to Utility/HEAC+. The pin with pin number 17 is assigned to DDC/CEC Ground/HEAC Shield. The pin with pin number 18 is assigned to the power supply (+5 V Power).

As described above, in the new HDMI pin assignment (see FIG. 6(*b*)), the terminals (the pins with pin numbers 2, 5, 8, and 11) used as the shield terminals in the current HDMI pin assignment (see FIG. 6(*a*)) are used as data terminals. In the new HDMI pin assignment, the terminals (the pins with pin numbers 10 and 12) used as the signal terminals for the differential signals of the clock signals in the current HDMI pin assignment are used as data terminals.

The data transmitting unit 112 of the source device 110 selects the current HDMI pin assignment shown in FIG. 6(*a*) when operating in the current HDMI operating mode, and selects the new HDMI pin assignment shown in FIG. 6(*b*) when operating in the new HDMI operating mode. The pin assignment in the receptacle 111 of the source device 110 has been described so far. Although not described in detail, the pin assignment in the receptacle 121 of the sink device 120 is the same as above in a case where the data receiving unit 122 of the sink device 120 is compatible with both the current HDMI and the new HDMI.

FIGS. 7(*a*) and 7(*b*) show the pin layouts in the receptacle 111 of the source device 110. FIG. 7(*a*) shows the pin layout in the current HDMI, and FIG. 7(*b*) shows the pin layout in the new HDMI. When the current HDMI pin assignment is selected as the pin assignment in the receptacle 111, the pins with pin numbers 2, 5, 8, and 11 are in a grounded state in the source device 110 and the sink device 120, or are in a grounded state in the sink device 120 and are in a high impedance state in the source device 110, or are in a high impedance state in the sink device 120 and are in a grounded state in the source device 110. Although not described in detail, the pin layout in the receptacle 121 of the sink device 120 is the same as above in a case where the data receiving unit 122 of the sink device 120 is compatible with both the current HDMI and the new HDMI.

Figure 8:
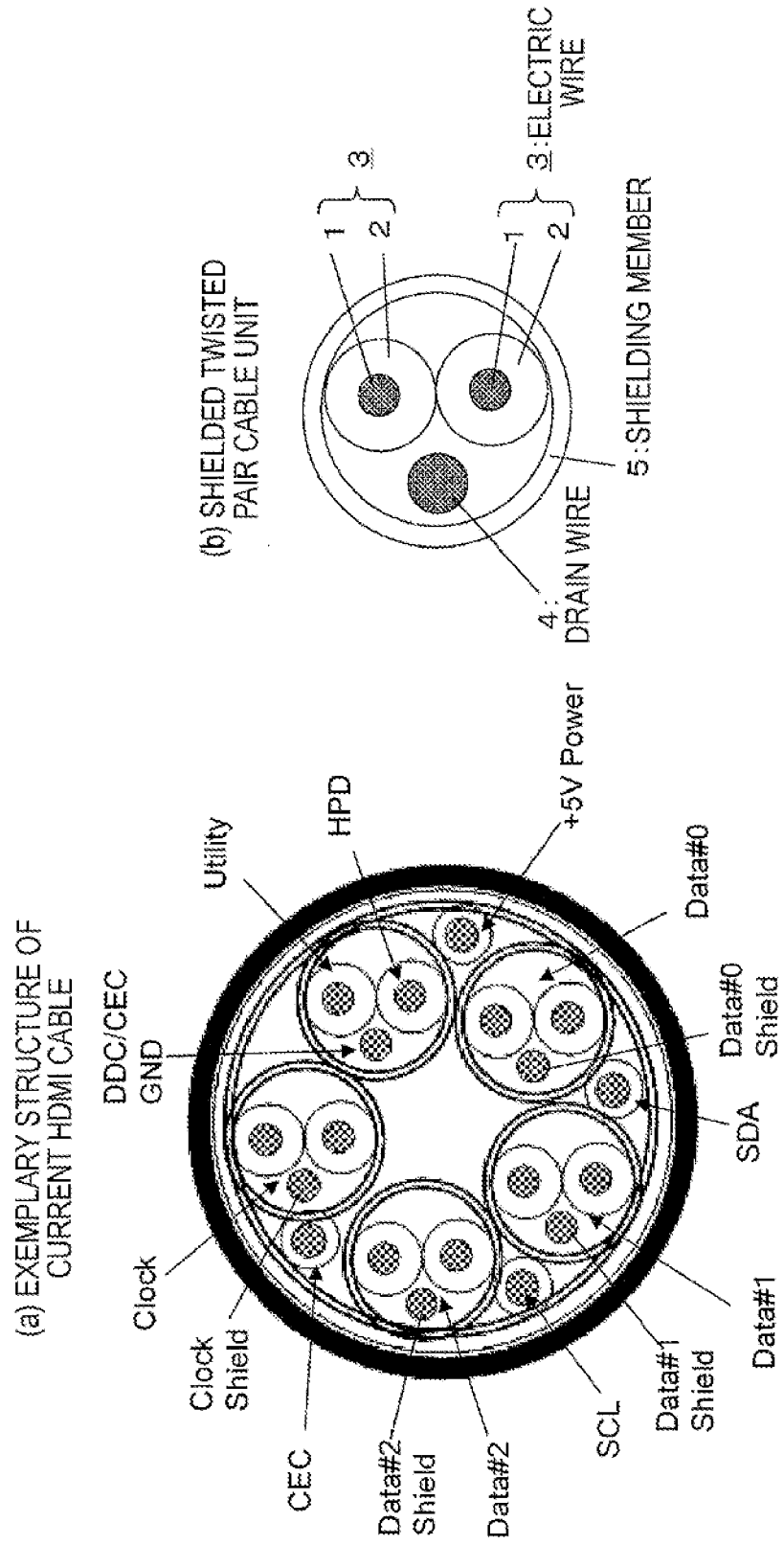
FIG. 8 is a diagram showing an exemplary structure of a current HDMI cable.

FIG. 8(*a*) shows an exemplary structure of the current HDMI cable used as the cable 200. In this current HDMI cable, three data line pairs are formed as shielded twisted pair cable units so as to achieve respective characteristics. Also, a clock line pair and a utility/HPD line pair to achieve the HEAC function are formed as shielded twisted pair cable units.

FIG. 8(*b*) shows an exemplary structure of a shielded twisted pair cable unit. This shielded twisted pair cable unit has a structure in which two electric wires 3 and a drain wire 4 are coated with a shielding member 5. Each of the electric wires 3 is formed with a core 1 coated with a coating portion 2.

In the current HDMI cable, the drain wires of the shielded twisted pair cable units of data and clock are connected to pins of plugs attached to the end portions of this cable. In this case, the respective drain wires are connected to the pins (terminals) corresponding to the respective shield terminals (the shielding pins with pin numbers 2, 5, 8, and 11) of the above described receptacle (the current HDMI pin layout). Those shield terminals are grounded in the source device 110 and the sink device 120. With this structure, the drain wires of the respective shielded twisted pair cable units of data and clock are grounded when the plug is connected to the receptacle (the current HDMI pin layout).

Figure 9:
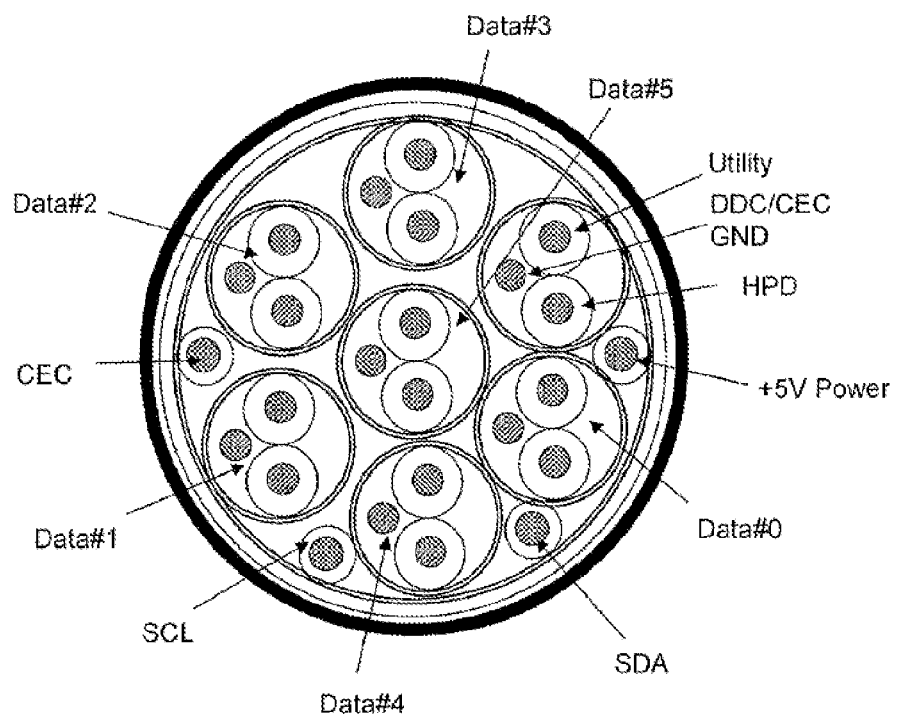
FIG. 9 is a diagram showing an exemplary structure of a new HDMI cable.

FIG. 9 shows an exemplary structure of the new HDMI cable used as the cable 200. In this new HDMI cable, six data line pairs are formed as shielded twisted pair cable units so as to achieve respective characteristics. Also, a utility/HPD line pair to achieve the HEAC function is formed as a shielded twisted pair cable unit.

The new HDMI cable includes a larger number of copper cables to be connected than in the current HDMI cable (see FIG. 8(*a*)). In this new HDMI cable, the drain wires of the respective shielded twisted pair cable units connected by special pins of the plugs at both ends of the cable are connected to metallic shells of the plugs. With this structure, the shielding pins are opened, and an increase in the number of required pins in the plugs is avoided. The plugs in the new HDMI cable are the same as the plugs in the current HDMI cable. As described above, where the drain wires of the respective shielded twisted pair cable units are connected to the metallic shells of the plugs, the shells of the receptacles into which the plugs are inserted are connected to the ground level, and accordingly, the differential pair lines can be shielded.

Figure 10:
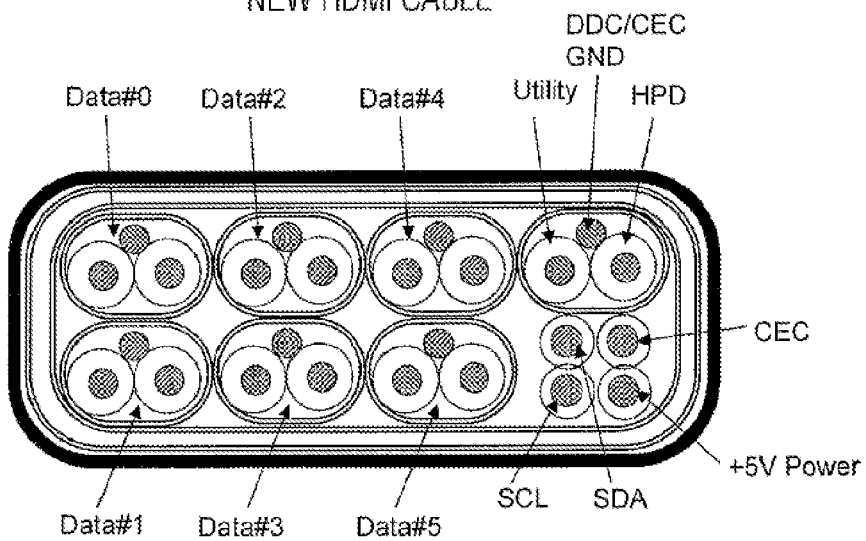
FIG. 10 is a diagram showing another exemplary structure of a new HDMI cable.

FIG. 10 shows another exemplary structure of the new HDMI cable used as the cable 200. The substantial structure of this new HDMI cable is the same as that of the above described new HDMI cable shown in FIG. 9, except for having a flat cross-sectional shape. With such a flat cross-sectional shape, the cross-sectional area can be made smaller, and impedance matching can be more easily achieved.

[Operating Mode Control in the Current HDMI and the New HDMI]

Next, the operating mode control in the source device 110 and the control unit 113 is described in greater detail. As described above, in a case where the control unit 113 determines that the cable 200 is compatible with the new HDMI, and the sink device 120 is compatible with the new HDMI, the control unit 113 controls the data transmitting unit 112 to operate in the new HDMI operating mode. In the other cases, the control unit 113 controls the data transmitting unit 112 to operate in the current HDMI operating mode.

Figure 11:
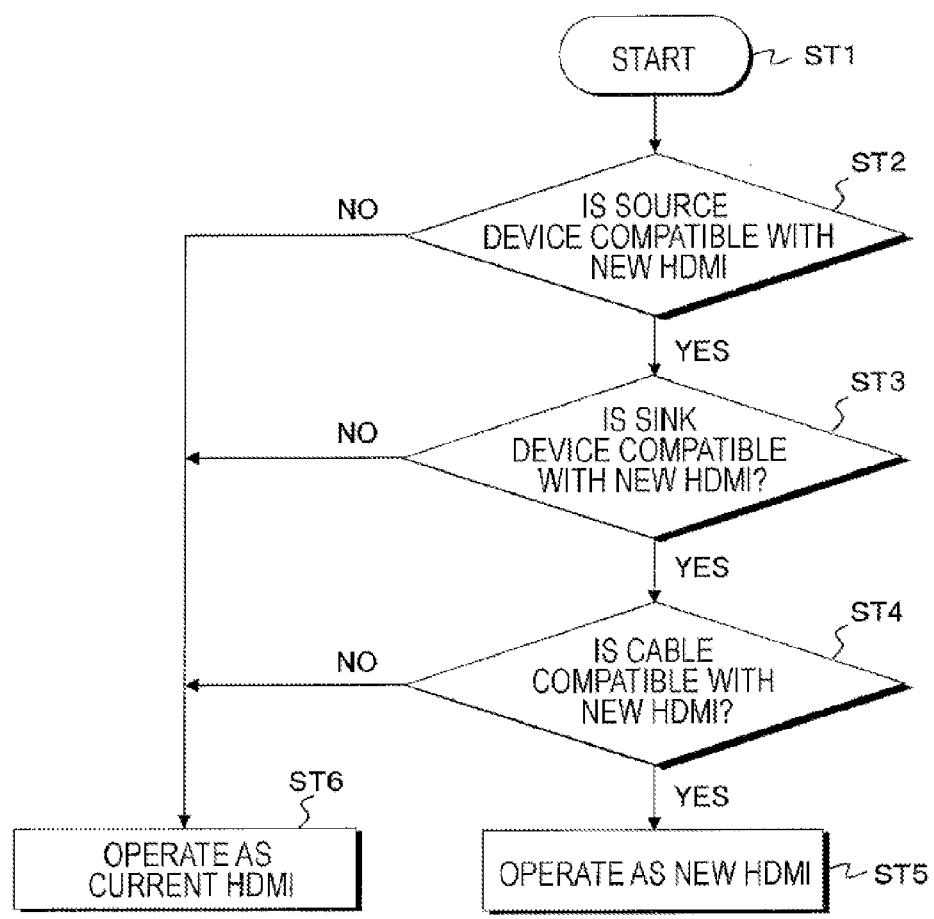
FIG. 11 is a flowchart showing an example of procedures in an operating mode controlling operation of the control unit of a source device.

The flowchart in FIG. 11 shows the procedures in an operating mode control operation of the control unit 113. In step ST1, the control unit 113 starts the operation, and moves on to the procedure of step ST2. In step ST2, the control unit 113 determines whether the source device 110 or the data transmitting unit 112 is compatible with the new HDMI. Storing beforehand the capability information about the source device 110 (the data transmitting unit 112) to which the control unit 113 belongs, the control unit 113 can easily perform the determination. In this embodiment, it is apparent that the source device 110 is compatible with the new HDMI, the control unit 113 may skip this determination procedure of step ST2.

When having determined that the source device 110 is compatible with the new HDMI, the control unit 113 determines in step ST3 whether the sink device 120 or the data receiving unit 122 is compatible with the new HDMI. This determination will be described later in detail. When having determined that the sink device 120 is compatible with the new HDMI, the control unit 113 moves on to the procedure of step ST4. In step ST4, the control unit 113 determines whether the cable 200 is compatible with the new HDMI. This determination will be described later in detail.

When having determined that the cable 200 is compatible with the new HDMI, the control unit 113 moves on to the procedure of step ST5. In step ST5, the control unit 113 controls the data transmitting unit 112 to operate in the new HDMI operating mode. When having determined in step ST2 that the source device 110 is not compatible with the new HDMI, in step ST3 that the sink device 120 is not compatible with the new HDMI, or in step ST4 that the cable 200 is not compatible with the new HDMI, the control unit 113 moves on to the procedure of step ST6. In step ST6, the control unit 113 controls the data transmitting unit 112 to operate in the current HDMI operating mode.

When having determined in step ST3 that the sink device 120 is compatible with the new HDMI, for example, the control unit 113 transmits the result of the last operation mode determination to the sink device 120 via the cable 200. The determination result is transmitted as control information such as an InfoFrame from the source device 110 prior to data transmission, for example. In the sink device 120, based on the operating mode determination result from the source device 110, the control unit 123 controls the data receiving unit 122 to operate in the same operating mode as the data transmitting unit 112 of the source device 110.

Figure 12:
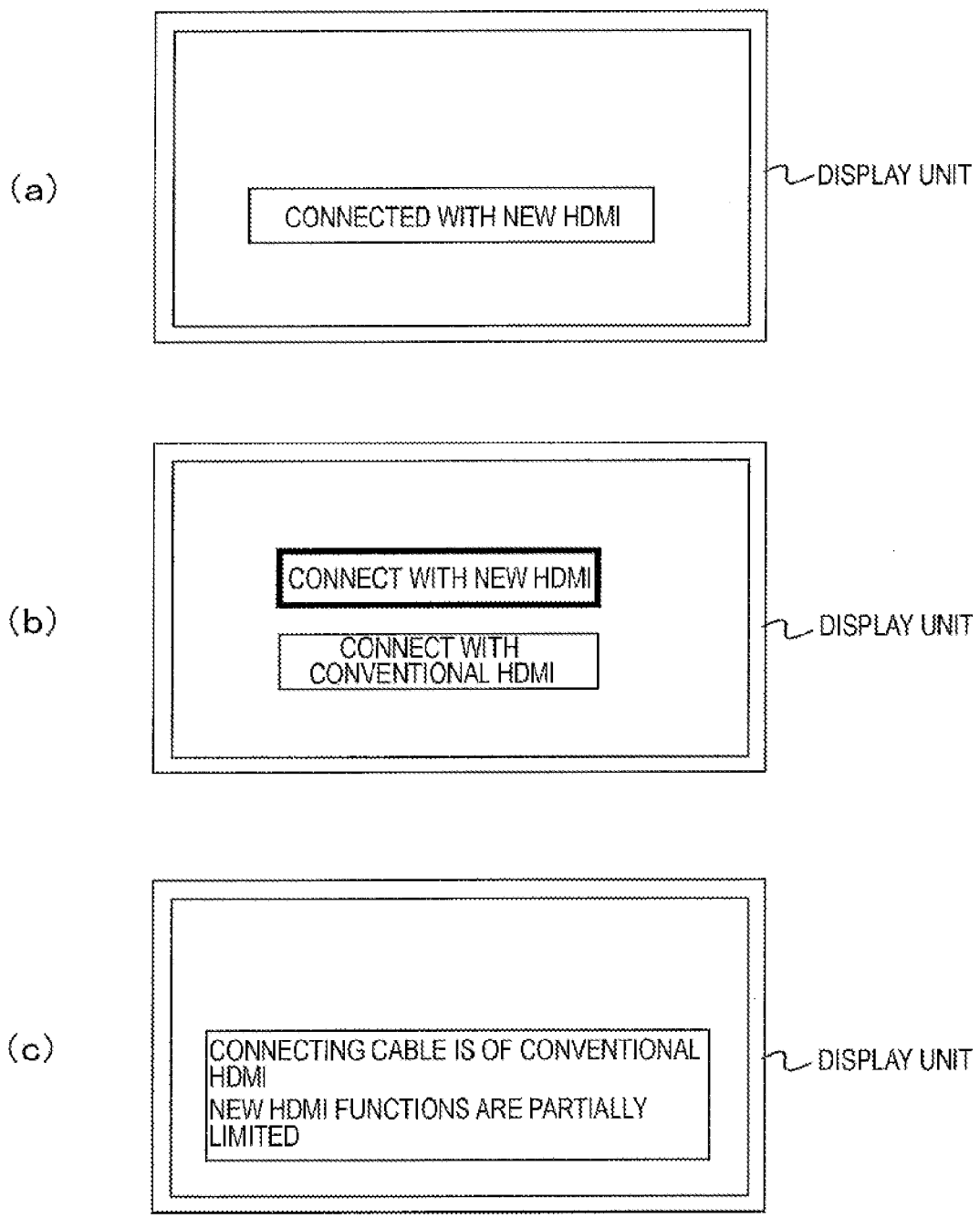
FIG. 12 is a diagram showing examples of UI screens displayed on a display unit (a display) under the control of the control unit of a source device.

When controlling in step ST5 the data transmitting unit 112 to operate in the new HDMI operating mode, the control unit 113 may perform the control so that the UI screen indicating the control result is displayed on a display unit (a display) as shown in FIG. 12(a), for example. With this UI screen, the user can easily recognize that the source device 110 and the sink device 120 are connected by the new HDMI. The display unit (the display) on which the UI screen is displayed may be a display unit (a display) (not shown) provided on the source device 110, or may be a display unit (a display) (not shown) provided on the sink device 120. The same applies to the respective UI screens described below.

When having determined in step ST4 that the cable 200 is not compatible with the new HDMI, and moving on to the procedure of step ST6, the control unit 113 may perform the control so that the UI screen indicating the result is displayed on the display unit (the display) as shown in FIG. 12(c), for example. With this UI screen, the user can easily recognize that the source device 110 and the sink device 120 are compatible with the new HDMI, but only the cable 200 is not compatible with the new HDMI, and can take measures by replacing the cable 200 with a new HDMI cable or the like.

In the procedures shown in the flowchart in FIG. 11, when having determined in step ST4 that the cable 200 is compatible with the new HDMI, the control unit 113 immediately moves on to step ST5, and controls the data transmitting unit 112 to operate in the new HDMI operating mode. When having determined in step ST4 that the cable 200 is compatible with the new HDMI, however, the control unit 113 may also allow the user to select the new HDMI or the current HDMI (the conventional HDMI) by exchanging commands beforehand through a line such as the CEC line prior to data transmission.

In that case, the control unit 113 performs the control so that the UI screen for the selection is displayed on the display unit (the display) as shown in FIG. 12(b), for example. Based on this UI screen, the user selects either the new HDMI or the current HDMI. FIG. 12(b) illustrates a situation where the "new HDMI" is selected. In accordance with the selection by the user, the control unit 113 controls the data transmitting unit 112 to operate in the new HDMI or current HDMI operating mode.

Figure 13:
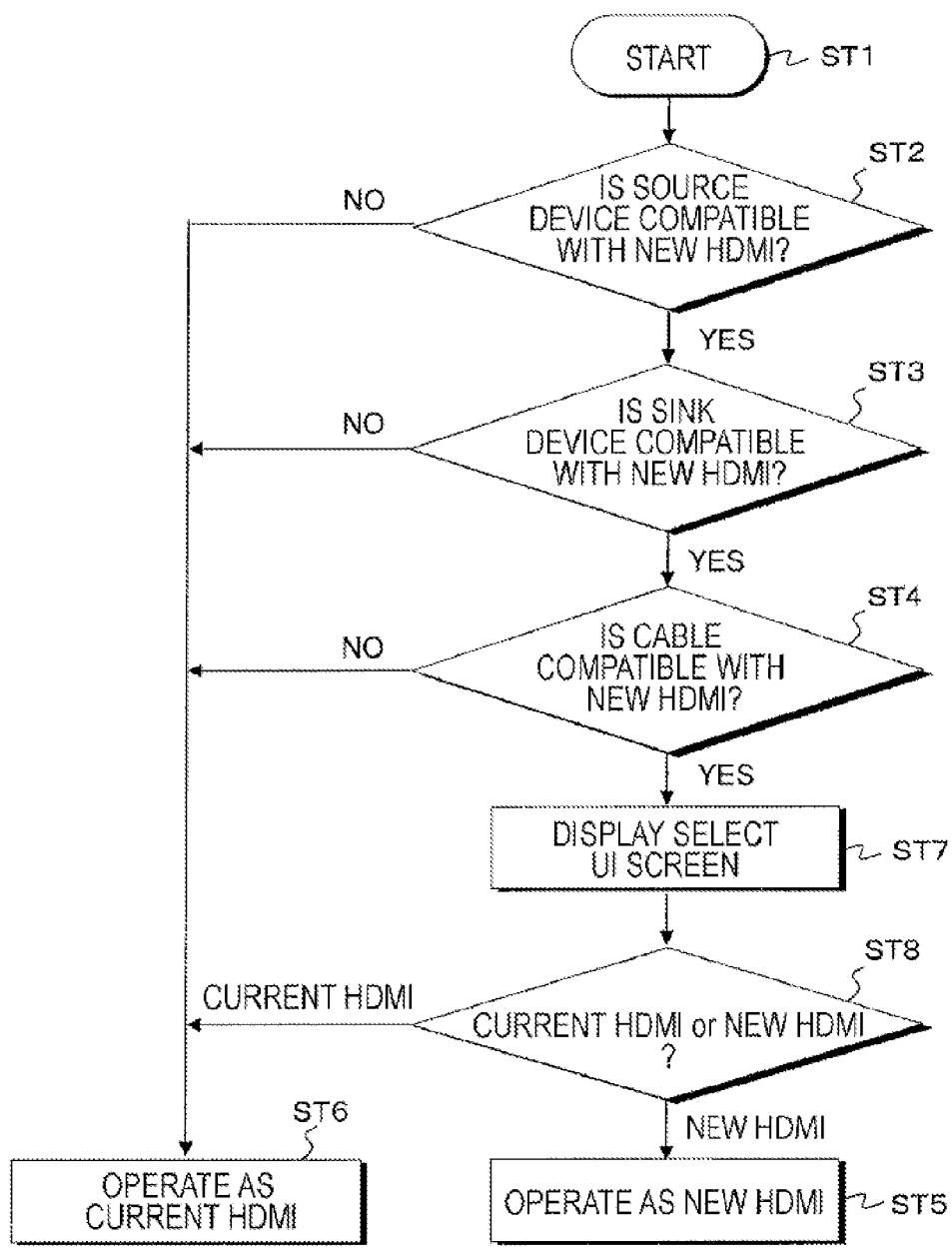
FIG. 13 is a flowchart showing another example of procedures in an operating mode controlling operation of the control unit of a source device.

The flowchart in FIG. 13 shows the procedures in an operating mode control operation to be performed by the control unit 113 in that case. In FIG. 13, the same steps as those in FIG. 11 are denoted by the same reference numerals as those in FIG. 11, and detailed explanation of them is not repeated herein. When having determined in step ST4 that the cable 200 is compatible with the new HDMI, the control unit 113 moves on to the procedure of step ST7. In step ST7, the control unit 113 performs control so that the UI screen for selecting either the new HDMI or the current HDMI is displayed on the display unit (the display). The UI may be transmitted as a video signal from the source device 110 through the cable 200, or the sink device 120 may be instructed to display the UI.

After that, the control unit 113 moves on to the procedure of step ST8. In step ST8, as the control unit 123 transmits a notification as to an operation performed by the user with a remote controller or the like through a line such as the CEC line, the control unit 113 determines which of the HDMIs, the new HDMI and the current HDMI, has been selected by the user. When the user has selected the new HDMI, the control unit 113 controls in step ST5 the data transmitting unit 112 to operate in the new HDMI operating mode. When the user has selected the current HDMI, on the other hand, the control unit 113 controls in step ST6 the data transmitting unit 112 to operate in the current HDMI (conventional HDMI) operating mode.

(Determination on Whether the Sink Device is Compatible with the New HDMI)

The methods used by the control unit 113 to determine whether the sink device 120 is compatible with the new HDMI are now described. The determination methods include the following first determination method and second determination method, for example.

(First Determination Method)

Based on EDID that is read from the sink device 120 by using the DDC line (the SDA line and the SCL line) of the cable 200, the control unit 113 determines whether the sink device 120 is compatible with the new HDMI. The EDID has a data structure that is specified in a format. Flag information indicating whether the sink device 120 is compatible with the new HDMI (new transmission) is newly defined at a predetermined site in the EDID.

FIG. 14 shows an example of the flag information newly defined in the EDID. Originally, the EDID is a data structure indicating various kinds of capabilities of the sink device 120. For ease of explanation, FIG. 14 shows only the bytes relevant to this invention in the EDID in a minimized manner. In bit 2, 1-bit flag information "New Rx Sink" indicating whether the sink device 120 is compatible with the new HDMI is written. In bit 1, 1-bit flag information "New Cable" indicating whether the cable 200 is compatible with the new HDMI is newly defined.

When the above described 1-bit flag information "New Rx Sink" exists in the EDID read from the sink device 120, the control unit 113 determines that the sink device 120 is compatible with the new HDMI. That is, in a case where the sink device 120 is compatible only with the current HDMI, the above described 1-bit flag information "New Rx Sink" does not exist in the EDID read from the sink device 120.

(Second Determination Method)

By performing communication with the sink device 120 through the cable 200, the control unit 113 determines whether the sink device 120 is compatible with the new HDMI. For example, the control unit 113 determines whether the sink device 120 is compatible with the new HDMI by using commands through the CEC line.

Also, the control unit 113 determines whether the sink device 120 is compatible with the new HDMI by performing communication with the sink device 120 through the bidirectional communication path (the HEAC function) formed with the utility line and the HPD line, for example. Further, the control unit 113 determines whether the sink device 120 is compatible with the new HDMI by exchanging some kind of signals through an unused line such as the utility line until transmission is allowed.

(Determination on Whether the Cable is Compatible with the New HDMI)

Next, the methods used by the control unit 113 to determine whether the cable 200 is compatible with the new HDMI are described. The determination methods include the following first through fourth determination methods, for example. The first through third determination methods are determination methods that are implemented by using the information providing function of the cable 200 in a case where the cable 200 is the new HDMI cable.

(First Determination Method)

Figure 15:
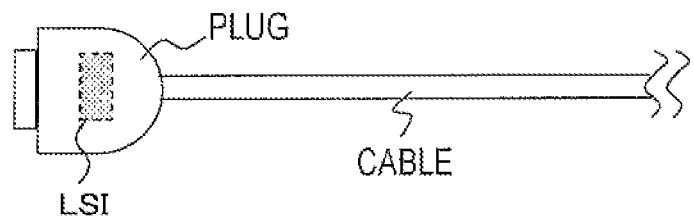
FIG. 15 is a diagram for explaining a method implemented by the control unit to determine whether the cable is compatible with the new HDMI, and is a diagram showing that an LSI is contained in a plug of the new HDMI cable.

In the case of the first determination method, the new HDMI cable contains an LSI (Large Scale Integration) in a plug as shown in FIG. 15, for example. In a situation where +5 V is supplied from the source device 110, for example, the sink device 120 requests an output from this LSI through the CEC protocol while the HPD is set at L. The sink device 120 in this case is a sink device compatible with the new HDMI. In response to the output request from the sink device 120, the LSI reports the values of registers mounted in the LSI (a notification of compatibility with the new HDMI, and cable property data such as the transmittable data band) to the sink device 120 through the CEC protocol.

The sink device 120 adds the information reported from the LSI to the EDID thereof. After the adding, the sink device 120 switches the HPD to H, to instruct the source device 110 to read the EDID. Based on the EDID that is read from the sink device 120, the control unit 113 determines whether the cable 200 is compatible with the new HDMI. That is, when there is information or the like indicating that the cable 200 is compatible with the new HDMI, the control unit 113 determines that the cable 200 is compatible with the new HDMI.

In the above description, the sink device 120 requests an output from the LSI through the CEC protocol. However, the source device 110 may request an output from the LSI through the CEC protocol, and receive a report of register values (the notification of compatibility with the new HDMI, and the cable property data such as the transmittable data band) directly from the LSI.

(Second Determination Method)

In the case of the second determination method, the new HDMI cable also contains an LSI in a plug as shown in FIG. 15, for example. When the HPD is switched from L to H, for example, the source device 110 reads and acquires EDID from the sink device 120, with the EDID indicating the capability thereof. In this case, the data written in the EEPROM in the sink device 120 is serially transmitted through the SDA/SCL line, so that the EDID is reported to the source side.

The LSI observes the line through the EDID information, or the SDA/SCL signal, during the EDID transmission. When the flag information indicating whether the cable 200 is compatible with the new HDMI (the bit 1 in the predetermined bytes in FIG. 14) is transmitted, the LSI changes the bit value to a state where the cable 200 is compatible with the new HDMI, or a state where the flag is on. Specifically, the data in the EDIDROM (EEPROM) in the sink device 120 is "00000100". However, the LSI in the cable rewrites the data during transmission, and the data is "00000110" when the source device 110 receives the data.

Based on the EDID that is read from the sink device 120, the control unit 113 determines whether the cable 200 is compatible with the new HDMI. Specifically, when the flag information indicating whether the cable 200 is compatible with the new HDMI (the bit 1 in the predetermined bytes in FIG. 14) indicates compatibility with the new HDMI, the control unit 113 determines that the cable 200 is compatible with the new HDMI.

Figure 16:
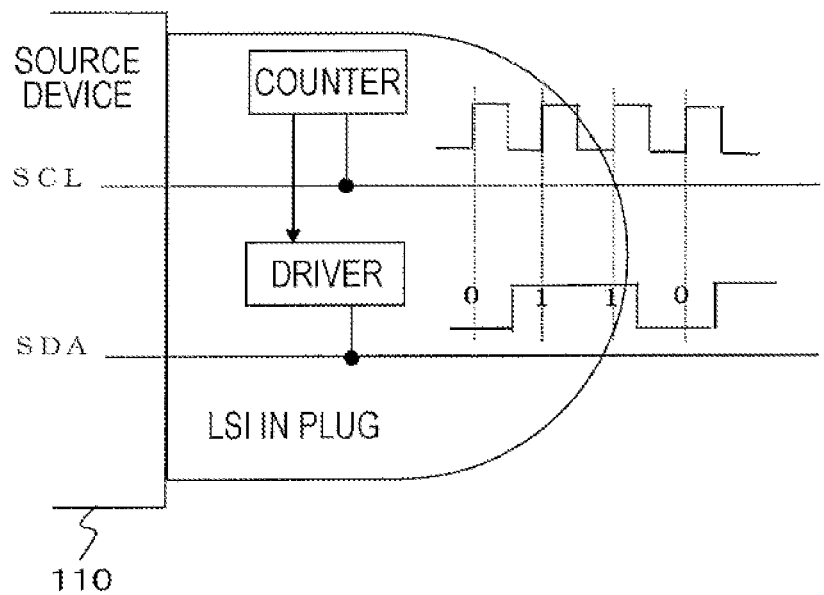
FIG. 16 is a diagram for explaining a method implemented by the control unit to determine whether the cable is compatible with the new HDMI, and is a diagram showing an example of an EDID data rewrite circuit of an LSI in the new HDMI cable.

FIG. 16 shows an example of the EDID data rewrite circuit of the LSI in the cable. This LSI includes a counter that counts clocks on the SCL line, and a driver that rewrites the data on the SDA line based on the count value of the counter.

(Third Determination Method)

Figure 17:
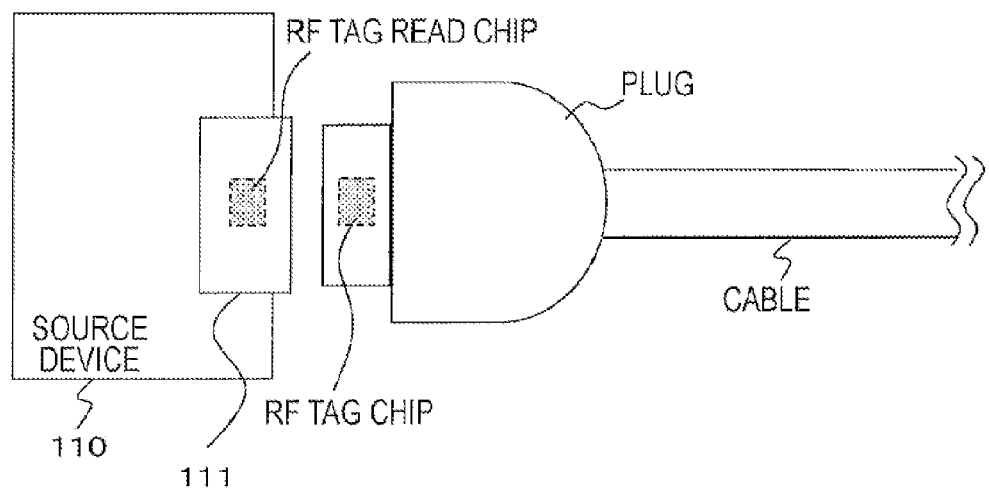
FIG. 17 is a diagram for explaining a method implemented by the control unit to determine whether the cable is compatible with the new HDMI, and is a diagram showing that a RF tag chip (LSI) is contained in a plug of the new HDMI cable.

In the case of the third determination method, the new HDMI cable contains a RF tag chip (LSI) in a plug as shown in FIG. 17, for example. The RF tag chip stores a notification of compatibility with the new HDMI, and information such as the transmittable data band. A RF tag read chip (LSI) is also contained in the receptacle 111 of the source device 110. In this case, near field communication is performed between the RF tag read chip of the receptacle 111 and the RF tag chip of the plug, and the information stored in the RF tag chip is read by the RF tag read chip.

Based on the information read by the RF tag read chip, the control unit 113 determines whether the cable 200 is compatible with the new HDMI. That is, when information indicating that the cable 200 is compatible with the new HDMI is read by the RF tag read chip, the control unit 113 determines that the cable 200 is compatible with the new HDMI.

In the above description, near field communication is performed between the RF tag read chip of the receptacle 111 of the source device 110 and the RF tag chip of the plug, and the information stored in the RF tag chip is read at the side of the source device 110. However, near field communication may be performed between a RF tag read chip of the receptacle 121 of the sink device 120 and the RF tag chip of the plug, and the information stored in the RF tag chip may be read at the side of the sink device 120 and then be provided to the side of the source device 110, for example.

(Fourth Determination Method)

Figure 18:
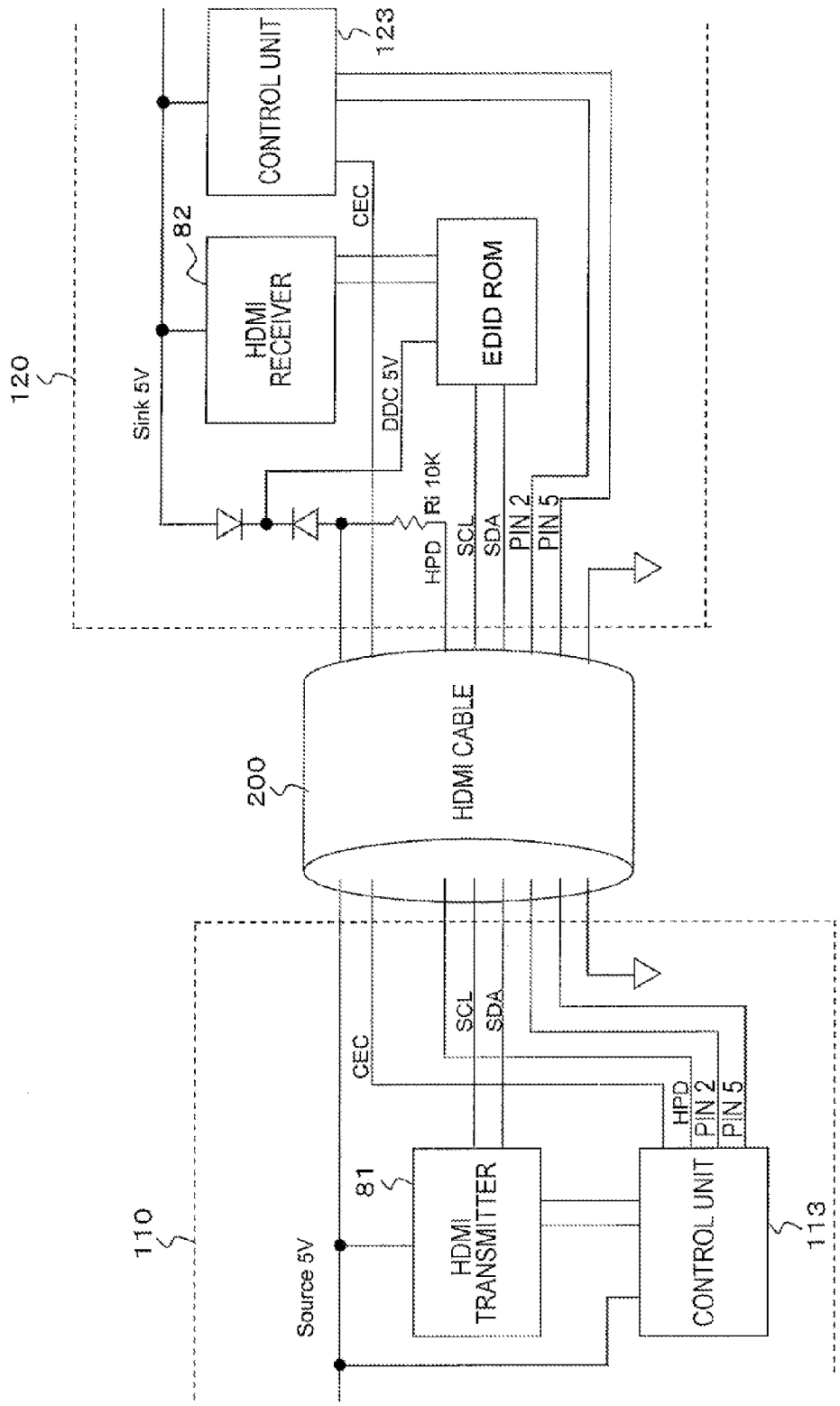
FIG. 18 is a diagram for explaining a method implemented by the control unit to determine whether the cable is compatible with the new HDMI, and is a diagram for explaining that the electrical properties of the cable are measured to determine whether the cable is compatible with the new HDMI.

In the case of the fourth determination method, the control unit 113 measures the electrical properties of the cable 200, to determine whether the cable 200 is compatible with the new HDMI. As shown in FIG. 18, the control unit 113 of the source device 110 transmits a test signal (a digital signal) for measurement and detection to the pin 2 and the pin 5, and the control unit 123 of the sink device 120 receives the signals. Although the pair of signal lines connected to the pin 2 and the pin 5 do not form a differential signal transmission path in the current HDMI cable, the pair of signal lines connected to the pin 2 and the pin 5 form a differential signal transmission path in the new HDMI cable (see FIGS. 6(*a*) and 6(*b*)).

The control unit 123 of the sink device 120 sends the received digital signal to the side of the source device 110 through another path (such as the DDC line indicated as SCL/SDA in the HDMI, the CEC line, or the utility line). The control unit 113 of the source device 110 determines whether the digital signal sent from the sink device 120 is the same as the digital signal transmitted therefrom, to determine whether the cable 200 is compatible with the new HDMI. That is, when the received digital signal and the transmitted digital signal are identical, the control unit 113 determines that the cable 200 is compatible with the new HDMI.

As shown in FIG. 19(*a*), in a case where the cable 200 is a current HDMI cable, the pair of signal lines connected to the pin 2 and the pin 5 do not form a shielded twisted pair cable. Therefore, in determining that the cable 200 is compatible with the current HDMI, the aspect that "a high-speed test signal cannot be transmitted" is used. At this point, a signal not concerning the pin 2 may be applied to the pin 1 or the pin 3 related to the pin 2, and the interference may be used. With this interference, transmitting a high-speed test signal becomes more difficult.

As shown in FIG. 19(*b*), in a case where the cable 200 is the new HDMI cable, on the other hand, the pair of signal lines connected to the pin 2 and the pin 5 form a shielded twisted pair cable. Therefore, in determining that the cable 200 is compatible with the new HDMI, the aspect that "a high-speed test signal can be transmitted" is used. Even if a signal not concerning the pin 2 is applied to the pin 1 or the pin 3 at this point, those pins are shielded independently of each other, and the applied signal does not interfere with the pin 2, and does not affect transmission of the test signal.

Here, the test signal is the data the source device 110 can output at the highest speed, and is random data that is long enough to be evaluated as $10^{-9}$, which is guaranteed as a bit error rate in the HDMI. Since a frame buffer memory for normal video reproduction is installed in the sink device 120, a memory specially for the transmission test may not be necessary.

In the above description, only when the received digital signal and the transmitted digital signal are identical, does the control unit 113 determine that the cable 200 is compatible with the new HDMI. The control unit 113 may lower the data transmission speed, and conduct the same test as above. By repeating the above described determining process until the matching is achieved, the capability of the cable is confirmed, and the cable is determined to be compatible with the new HDMI. However, only data that is transmittable at the transmission speed or lower may be transmitted. In this case, there is a possibility that the current HDMI cable is determined to be compatible with the new HDMI.

In the above description, the pin 2 and the pin 5 are used. However, instead of those pins, the pin 8 and the pin 11, which have the same relationship as those pins between the current HDMI cable and the new HDMI cable, may be used. That is, the pair of signal lines connected to the pin 8 and the pin 11 do not form a differential signal transmission path in the current HDMI cable, but the pair of signal lines connected to the pin 8 and the pin 11 form a differential signal transmission path in the new HDMI cable (see FIGS. 6(*a*) and 6(*b*)).

In the above description, the digital signal (the test signal) the source device 110 has transmitted to the sink device is sent from the sink device 120, which has received the digital signal, to the source device 110, and a check is made to determine whether the transmitted signal and the received signal are identical at the side of the source device 110. However, a predetermined pattern may be transmitted as a digital signal (a test signal), and the sink device 120 may determine whether the received digital signal is correct, and send only the result to the source device 110 through a line such as the CEC line or add the information to the E-EDID thereof.

As described above, in the AV system 100 shown in FIG. 1, the data transmitting unit 112 of the source device 110 has the new HDMI operating mode as well as the current HDMI operating mode. Here, the number of differential signal channels for transmitting digital signals such as video data is three in the current HDMI, but is six in the new HDMI. Accordingly, by using the new HDMI, signals can be transmitted at a high data rate. Also, when the sink device 120 and the cable 200 are not compatible with the new HDMI, the current HDMI (the conventional HDMI) is used, to secure backward compatibility.

<2. Modifications>

In the above described embodiments, the plugs of the new HDMI cable has the same shape as the plugs of the current HDMI cable (the conventional HDMI cable). However, the shape of the plugs of the new HDMI cable can be different from the shape of the plugs of the current HDMI cable so that, when either the source device or the sink device is not compatible with the new HDMI, those devices are not connected by the new HDMI cable.

FIG. 20(*a*) shows the shape of each plug of the current HDMI cable, and FIG. 20(*b*) shows the shape of each receptacle of a source device and a sink device compatible only with the current HDMI. On the other hand, FIG. 20(*c*) shows the shape of each plug of the new HDMI cable, and FIG. 20(*d*) shows an example of the shape of each receptacle of a source device and a sink device compatible with the new HDMI. FIG. 21(*a*) is a perspective view of a plug of the current HDMI cable, and FIG. 21(*b*) is a perspective view of a plug of the new HDMI cable.

Each plug of the new HDMI cable has a convex portion (indicated by an arrow P). Each receptacle of a source device and a sink device that are compatible with the new HDMI has a concave portion (indicated by an arrow Q) corresponding to the convex portion of each plug. In this case, the shape of each receptacle of the source device and the sink device compatible with the new HDMI matches the shape of each plug of the new HDMI cable, and is designed to include the shape of each plug of the current HDMI cable.

The shape of the plugs of the new HDMI cable and the shape of the receptacles of the source device and the sink device compatible with the new HDMI are designed as described above, so that the new HDMI cable can be connected to the receptacles of the source device and the sink device compatible with the new HDMI. However, the new HDMI cable cannot be connected to the receptacles of a source device and a sink device that are compatible only with the current HDMI. Therefore, when either the source device or the sink device is not compatible with the new HDMI, those devices are not connected by the new HDMI cable. That is, only when both the source device and the sink device are compatible with the new HDMI, can those devices be connected by the new HDMI cable.

As described above, the shape of each receptacle of a source device and a sink device that are compatible with the new HDMI matches the shape of each plug of the new HDMI cable, and is designed to include the shape of each plug of the current HDMI cable. Accordingly, the current HDMI cable can be connected not only to the receptacles of a source device and a sink device that are compatible only with the current HDMI, but also to the receptacles of a source device and a sink device that are compatible with the new HDMI.

Also, in the above described embodiments, the number of differential signal channels is six in the new HDMI, while the number of differential signal channels for transmitting digital signals such as video data is three in the current HDMI. However, the number of differential signal channels for transmitting digital signals such as video data is not limited to six, but may be four, five, seven, or the like. For example, the number of differential signal channels for transmitting digital signals such as video data is five, and the clock frequency is made 1.2 times higher. With this, the same data transmission speed as that in the case of six channels can be achieved.

Also, in the above described embodiments, this invention is applied to an AV system in which a source device and a sink device are connected by a digital interface compliant with the HDMI standard. This invention can also be applied to any AV system in which those devices are connected by a digital interface compliant with some other standard.

Industrial Applicability

This invention can be applied to an AV system or the like that is formed by connecting a source device and a sink device with a digital interface, for example.

Reference Signs List
81 HDMI transmitter
82 HDMI receiver
100 AV system
110 Source device
111 Receptacle
112 Data transmitting unit
113 Control unit
120 Sink device
121 Receptacle
122 Data receiving unit
123 Control unit
200 Cable
201, 202 Plug

The invention claimed is:

1. A transmitting device comprising:
a digital signal transmitting unit configured to transmit a digital signal to an external device via a transmission path with a differential signal, and have a first operating mode involving a first number of channels for the differential signal and a second operating mode involving a second number of channels for the differential signal, the second number being larger than the first number;
an operating mode determining unit configured to determine whether the external device and the transmission path are compatible with the second operating mode; and
an operation control device to control the operation of the digital signal transmitting unit, based on the determination performed by the operating mode determining unit,
wherein said digital signal transmitting unit transmits said digital signal by superimposing a carrier clock thereon.

2. The transmitting device according to claim 1, further comprising:
a receptacle configured to connect a plug of the transmission path thereto, the transmission path being a cable, the receptacle having a plurality of pins,
wherein the digital signal transmitting unit selects a first pin assignment in the first operating mode, and selects a second pin assignment in the second operating mode, the second pin assignment being different from the first pin assignment.

3. The transmitting device according to claim 2, wherein, in the second pin assignment, a terminal that is used as a shield terminal corresponding to a signal terminal for a differential signal for a digital signal and/or a clock signal in the first pin assignment is used as a signal terminal for a differential signal for transmitting a digital signal.

4. The transmitting device according to claim 2, wherein, in the second pin assignment, a signal terminal for a differential signal for a clock signal in the first pin assignment is used as a signal terminal for a differential signal for transmitting a digital signal.

5. The transmitting device according to claim 1, wherein the operating mode determining unit determines whether the external device is compatible with the second operating mode, based on capability information about the external device, the capability information being read from the external device via the transmission path.

6. The transmitting device according to claim 1, wherein the operating mode determining unit determines whether the external device is compatible with the second operating mode, by performing communication with the external device via the transmission path.

7. The transmitting device according to claim 1, wherein the operating mode determining unit determines whether the transmission path is compatible with the second operating mode, by using an information providing function of the transmission path compatible with the second operating mode.

8. The transmitting device according to claim 7, wherein the information providing function of the transmission path compatible with the second operating mode is a function to report to the external device that the transmission path is compatible with the second operating mode, the external device has a function to add the information reported from the transmission path to capability information thereof, and the operating mode determining unit determines whether the transmission path is compatible with the second operating mode, based on the capability information read from the external device via the transmission path.

9. The transmitting device according to claim 7, wherein the information providing function of the transmission path compatible with the second operating mode is a function to rewrite information indicating whether the transmission path is compatible with the second operating mode, to indicate compatibility with the second operating mode, the information being contained in capability information read from the external device, and the operating mode determining unit determines whether the transmission path is compatible with the second operating mode, based on the capability information read from the external device via the transmission path.

10. The transmitting device according to claim 7, wherein the information providing function of the transmission path compatible with the second operating mode is a function to provide information indicating that the transmission path is compatible with the second operating mode through near field communication, and the operating mode determining unit determines whether the transmission path is compatible with the second operating mode, based on whether the information indicating that the transmission path is compatible with the second operating mode is provided from the transmission path through the near field communication.

11. The transmitting device according to claim 1, wherein the operating mode determining unit transmits a differential signal for a predetermined digital signal to the external device by using a pair of signal lines in the transmission path, and performs the determination based on a signal sent from the external device, the pair of signal lines not forming a differential signal transmission path in the first operating mode, the pair of signal lines forming a differential signal transmission path in the second operating mode.

12. The transmitting device according to claim 11, wherein the signal sent from the external device is a signal indicating whether a received digital signal obtained from the predetermined differential signal received by the external device is correct.

13. The transmitting device according to claim 11, wherein the signal sent from the external device is a received digital signal obtained from the predetermined differential signal received by the external device.

14. The transmitting device according to claim 1, further comprising: an information transmitting unit configured to transmit the result of the determination performed by the operating mode determining unit to the external device via the transmission path.

15. The transmitting device according to claim 2, wherein a shape of the receptacle matches a shape of the plug of the cable compatible with the second operating mode, and includes a shape of the plug of the cable compatible with the first operating mode.

16. The transmitting device according to claim 1, further comprising: a display control unit configured to control display on a display unit for providing control information about the operation control unit to a user.

17. The transmitting device according to claim 16, wherein, when the operating mode determining unit determines that the external device and the transmission path are compatible with the second operating mode, the display control unit performs control to display a user interface screen on the display unit, the user interface screen being for causing a user to select one of the first operating mode and the second operating mode for the digital signal transmitting unit.

18. A transmitting method comprising:
a digital signal transmitting step of transmitting, by a digital signal transmitting unit, a digital signal to an external device via a transmission path with a differential signal in a first operating mode involving a first number of channels for the differential signal or in a second operating mode involving a second number of channels for the differential signal, the second number being larger than the first number;
an operating mode determining step of determining whether the external device and the transmission path are compatible with the second operating mode; and
an operation controlling step of controlling, by use of a processor, the operation of the digital signal transmitting step, based on the determination performed in the operating mode determining step,
wherein said digital signal transmitting unit transmits said digital signal by superimposing a carrier clock thereon.

19. A receiving device comprising:
a digital signal receiving unit configured to receive a digital signal from an external device via a transmission path with a differential signal, and have a first operating mode involving a first number of channels for the differential signal and a second operating mode involving a second number of channels for the differential signal, the second number being larger than the first number;
an information receiving unit configured to receive, from the external device, operating mode information indicating which one of the first operating mode and the second operating mode is to be selected; and
an operation control device to control the operation of the digital signal receiving unit, based on the operating mode information received by the information receiving unit,
wherein said digital signal receiving unit receives said digital signal with a carrier clock superimposed thereon.

20. A receiving method comprising:
a digital signal receiving step of receiving, by a digital signal receiving unit, a digital signal from an external device via a transmission path with a differential signal in a first operating mode involving a first number of channels for the differential signal or in a second operating mode involving a second number of channels for the differential signal, the second number being larger than the first number;
an information receiving step of receiving, from the external device, operating mode information indicating which one of the first operating mode and the second operating mode is to be selected; and
an operation controlling step of controlling, by use of a processor, the operation in the digital signal receiving step, based on the operating mode information received in the information receiving step,
wherein said digital signal receiving unit receives said digital signal with a carrier clock superimposed thereon.

21. A transmitting/receiving system formed by connecting a transmitting device and a receiving device via a transmission path, the transmitting device comprising:
a digital signal transmitting unit configured to transmit a digital signal to the receiving device via the transmission path with a differential signal, and have a first operating mode involving a first number of channels for the differential signal and a second operating mode involving a second number of channels for the differential signal, the second number being larger than the first number;
an operating mode determining unit configured to determine whether the receiving device and the transmission path are compatible with the second operating mode;
a transmitting operation control unit configured to control the operation of the digital signal transmitting unit, based on the determination performed by the operating mode determining unit; and
an information transmitting unit configured to transmit operating mode information about the digital signal transmitting unit to the receiving device via the transmission path,
the receiving device comprising:
a digital signal receiving unit configured to receive the digital signal from the transmitting device via the transmission path with the differential signal, and have the first operating mode involving the first number of channels for the differential signal and the second operating mode involving the second number of channels for the differential signal;

an information receiving unit configured to receive the operating mode information from the transmitting device via the transmission path; and a receiving operation control device to control the operation of the digital signal receiving unit, based on the operating mode information received by the information receiving unit, wherein said digital signal transmitting unit transmits said digital signal by superimposing a carrier clock thereon.

22. A cable that transmits a digital signal from a transmitting device to a receiving device with a differential signal having a predetermined number of channels, the cable comprising:

an information providing function unit configured to provide information indicating signal transmission capability of the cable to one of the transmitting device and the receiving device, wherein the transmitting device is configured to transmit the digital signal to the receiving device via a transmission path with the differential signal, and have a first operating mode involving a first number of channels for the differential signal and a second operating mode involving a second number of channels for the differential signal, the second number being larger than the first number, and wherein said transmitting device transmits said digital signal by superimposing a carrier clock thereon.

23. The cable according to claim 22, wherein the information providing function unit provides the information indicating the signal transmission capability of the cable to one of the receiving device and the transmitting device via the cable, in response to a request from the one of the receiving device and the transmitting device.

24. The cable according to claim 22, wherein the information providing function unit rewrites part of capability information read by the transmitting device from the receiving device via the cable.

25. The cable according to claim 22, wherein the information providing function unit provides the information indicating the signal transmission capability of the cable to one of the transmitting device and the receiving device through near field communication.

* * * * *

UNITED STATES PATENT AND TRADEMARK OFFICE
CERTIFICATE OF CORRECTION

PATENT NO. : 8,843,679 B2  
APPLICATION NO. : 13/825484  
DATED : September 23, 2014  
INVENTOR(S) : Kazuaki Toba et al.

Page 1 of 1

It is certified that error appears in the above-identified patent and that said Letters Patent is hereby corrected as shown below:

On the title page of the patent, please insert item (*) --Terminal Disclaimer Filed--.

Signed and Sealed this
Third Day of February, 2015

Michelle K. Lee
*Deputy Director of the United States Patent and Trademark Office*